United States Patent
Huang et al.

(10) Patent No.: US 11,200,451 B2
(45) Date of Patent: Dec. 14, 2021

(54) OBJECT RECOGNITION METHOD AND APPARATUS

(71) Applicant: CANON KABUSHIKI KAISHA, Tokyo (JP)

(72) Inventors: Yaohai Huang, Beijing (CN); Jianteng Peng, Beijing (CN); Weihong Deng, Beijing (CN); Jiani Hu, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 72 days.

(21) Appl. No.: 16/680,233

(22) Filed: Nov. 11, 2019

(65) Prior Publication Data

US 2020/0151502 A1 May 14, 2020

(30) Foreign Application Priority Data

Nov. 14, 2018 (CN) .......................... 201811351009.1

(51) Int. Cl.
*G06K 9/62* (2006.01)
*G06K 9/00* (2006.01)

(52) U.S. Cl.
CPC ....... *G06K 9/6255* (2013.01); *G06K 9/00228* (2013.01); *G06K 9/6202* (2013.01); *G06K 9/627* (2013.01); *G06K 9/6218* (2013.01); *G06K 9/6256* (2013.01)

(58) Field of Classification Search
None
See application file for complete search history.

(56) References Cited

U.S. PATENT DOCUMENTS

2015/0286864 A1* 10/2015 Gottemukkula ..... G06K 9/6212
382/117

FOREIGN PATENT DOCUMENTS

| CN | 104361328 A | 2/2015 |
|----|-------------|--------|
| CN | 105512638 A | 4/2016 |
| CN | 107066969 A | 8/2017 |
| CN | 107871103 A | 4/2018 |
| CN | 108241836 A | 7/2018 |
| EP | 2869239 A2  | 5/2015 |

OTHER PUBLICATIONS

Cao, Qiong, et al., VGGFace2: A dataset for recognising faces across pose and age, Oct. 23, 2017, 10 pages, arXiv:1710.08092vi [cs.CV].
Liu, Weiyang, SphereFace: Deep Hypersphere Embedding for Face Recognition, CVPR, 2017, pp. 212-220.
Dong, Bin, Attention-Based Template Adaptation for Face Verification, 2017 IEEE 12th International Conference on Automatic Face & Gesture Recognition, pp. 914-946, IEEE Computer Society.

* cited by examiner

*Primary Examiner* — Leon Flores
(74) *Attorney, Agent, or Firm* — Canon U.S.A., Inc. IP Division

(57) ABSTRACT

A template determining apparatus including an attribute distribution determination unit configured to determine a distribution of a specific attribute in a plurality of images; and a template determination unit configured to adaptatively determine a template set from the plurality of images according to the determined distribution of the specific attribute of the plurality of images. Where the determined template set will be used for image normalization.

31 Claims, 19 Drawing Sheets

OBJECT RECOGNITION METHOD AND APPARATUS

CROSS-REFERENCE TO RELATED APPLICATIONS

This application claims the benefit of Chinese Patent Application No. 201811351009.1, filed Nov. 14, 2018, which is hereby incorporated by reference herein in its entirety.

FIELD OF THE INVENTION

The present disclosure relates to object recognition in images, and more particularly to adaptive image object recognition.

BACKGROUND OF THE INVENTION

In recent years, object detection/recognition/tracking in still images or a series of moving images has been widely and importantly applied to, and plays an important role in, the fields of image processing, computer vision, and pattern recognition. An object may be a part of a person's body, such as face, hand, body, etc., other organisms or plants, or any other objects that are desired to be detected.

Object alignment plays a very important role in object detection/recognition/tracking. A common object alignment operation is, for example, a face alignment operation.

The face alignment operation typically includes Template-based face alignment and Spatial Transform Network (STN)-based face alignment. In the traditional Template-based face alignment, faces are aligned to the same frontal face template by means of similarity transform. In the traditional face alignment based on spatial transform network, the spatial transform network aligns all faces to the same pose which is best for recognition by learning.

However, in such conventional face alignment operations, aligning all images to the same image would introduce noise and distortion into the images. In particular, for a face image with a large angle, especially a fully-lateral face image, more noise occurs during alignment to a frontal face template, including more geometric distortion and information loss in face images. Such distortion can increase the image distortion, which in turn causes the accuracy of the face recognition model to degrade.

Therefore, there is a need for an improved technique to improve object recognition in images.

SUMMARY OF THE INVENTION

It is an object of the present disclosure to improve object recognition in images.

The present disclosure proposes improved image normalization (e.g., alignment) for optimizing object recognition, wherein a template for image normalization is adaptively determined by referring to attribute distributions in training images, thereby the determined template enables the images to be more optimally normalized, and object recognition can be improved based on such normalized images.

The present disclosure proposes improved determination of a model for object recognition, wherein the model for object recognition is determined by using training images that have been optimally normalized as described above, such that the model for object recognition can be improved, so as to further improve object recognition.

The present disclosure also proposes an improved object recognition method in which object images are normalized by using the improved template as described above, and features of the normalized object images are extracted, so that the object recognition result can be further improved.

In one aspect, there provides an apparatus for determining a template, comprising: an attribute distribution determination unit, configured to determine distribution of a specific attribute in the plurality of images; and a template determination unit, configured to adaptively determine a template set from the plurality of images according to the determined distribution of the specific attribute of the plurality of images, wherein, the determined template set will be used for image normalization.

In another aspect, there provides a method for determining a template, comprising: an attribute distribution determination step to determine distribution of a specific attribute in the plurality of images; and a template determination step to adaptively determine a template set from the plurality of images according to the determined distribution of the specific attribute of the plurality of images, wherein, the determined template set will be used for image normalization.

In another aspect, there provides an apparatus for generating model, comprising: a template set generation unit configured to apply the method as described hereinbefore to a plurality of training images including the object to generate a template set; a normalization unit configured to normalize each of the plurality of training images according to its corresponding template in the template set; and a model training unit configured to perform training based on the normalized plurality of training images to determine an object recognition model.

In another aspect, there provides a method for generating model, comprising: a template set generation step to apply the method as described hereinbefore to a plurality of training images including the object to generate a template set; a normalization step to normalize each of the plurality of training images according to its corresponding template in the template set; and a model training step to perform training based on the normalized plurality of training images to determine an object recognition model.

In another aspect, there provides a model generation apparatus, comprising: a classification unit configured to classify specific attributes of a plurality of images through a classification network; a division unit configured to divide the plurality of images into a specific number of sets according to the classification of the specific attributes, and each set has the same attribute classification label; a normalization unit configured to train the image sets through a transformation network to obtain normalized images; and a model generation unit configured to generate an object recognition model based on the normalized images.

In another aspect, there provides a model generation method, comprising: a classification step to classify specific attributes of a plurality of images through a classification network; a division step to divide the plurality of images into a specific number of sets according to the classification of the specific attributes, and each set has the same attribute classification label; a normalization step to train the image sets through a transformation network to obtain normalized images; and a model generation step to generate an object recognition model based on the normalized images.

In another aspect, there provides an object recognition apparatus, comprising: a to-be-recognized image normalization unit configured to normalize the to-be-recognized images to obtain normalized to-be-recognized images; a recognition unit configured to apply an object recognition model generated by the apparatus as described hereinbefore to the normalized to-be-recognized images to obtain a feature vector of the object for object recognition.

In another aspect, there provides an object recognition method, comprising: a to-be-recognized image normalization step to normalize the to-be-recognized images to obtain normalized to-be-recognized images; a recognition step to apply an object recognition model generated by the apparatus as described hereinbefore to the normalized to-be-recognized images to obtain a feature vector of the object for object recognition.

Further characteristic features and advantages of the present invention will be apparent from the following description with reference to the drawings.

BRIEF DESCRIPTION OF THE DRAWINGS

The accompanying drawings, which are incorporated in and constitute apart of the specification, illustrate embodiments of the invention and, together with the description, serve to explain the principles of the invention, without limitation.

In the figures, similar reference numerals are used for denoting similar items.

DESCRIPTION OF THE EMBODIMENTS

Figure 1A:
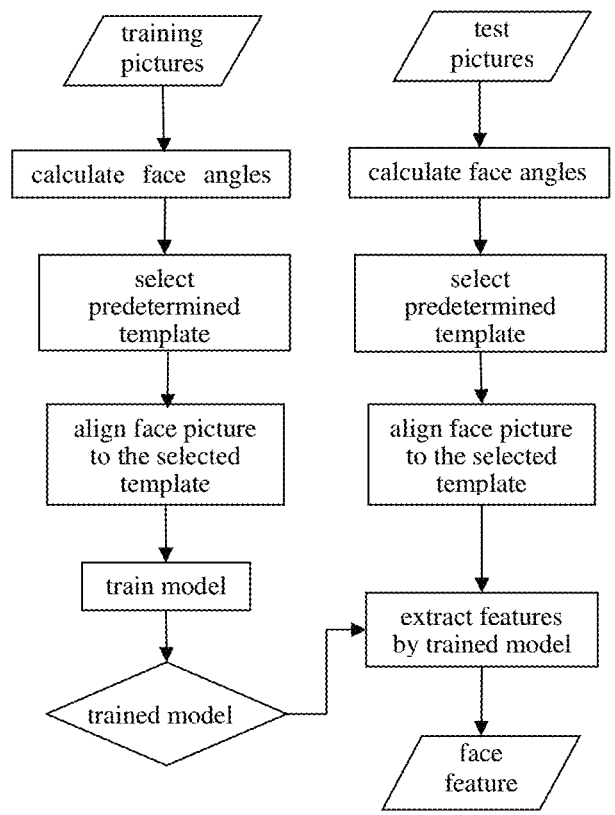
FIG. 1A, 1B are schematic diagrams of face recognition according to the prior art.

Example possible embodiments, which relate to object recognition, are described herein. In the following description, for the purpose of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

In the context of the present disclosure, an image may refer to any of a variety of images, such as color images, grayscale images, and the like. It should be noted that in the context of the present specification, the type of image is not particularly limited as long as such an image can be subject to processing so that it can be detected whether the image contains an object. Moreover, the image may be an original image or a processed version of the image, such as a version of the image that has undergone preliminary filtering or pre-processing (such as DCT (Discrete Cosine Transform)) prior to the operations of the present application being performed on the image.

In the context of this specification, an image containing an object means that the image contains an object image of the object. This object image may also be referred to as an object area in the image. Object recognition also refers to recognition of an object in an object area in an image.

Herein, an object may be a body part of a person, such as a face, a hand, a body, etc., other organisms or plants, or any other object that is desired to be detected, and an object image may have various attributes, which may include, for example, attributes related to characteristics of the image itself, or attributes related to various postures, states, and the like of the object. As an example, if the object is a person's face, the attribute may be a pose of the face, such as the orientation angle of the face, etc.; if the object is a person's body, the attribute may be the angle of the person's body, and the pose of the person's body (the pose may be determined by spatial positions of the person's joints).

As an example, a feature of an object, in particular a representative feature, may be represented in a vector form, which may be referred to as a "feature vector" of the object. For example, in a case of detecting a face, the pixel texture information, the position coordinates, and the like of the representative part of the face are selected as features to constitute the feature vector of the image. Thereby, object recognition/detection/tracking can be performed based on the obtained feature vector.

Embodiments of the present invention will be described in detail below with reference to the accompanying drawings. It should be noted that like reference numerals and characters indicate similar items in the drawings, and thus, once an item is defined in one figure, it is not necessary to discuss the subsequent figures.

In the present disclosure, the terms "first", "second", and the like are used merely to distinguish between elements or steps, rather than indicating chronological order, preference, or importance.

In object recognition, normalizing an object image is a very important operation. A common implementation of normalization of object images is object alignment, which refers to aligning object images in different poses in an image to the same pose, thereby performing object detection/recognition/tracking based on the aligned object images.

Face recognition is a common object recognition operation in which face alignment belongs to a kind of normalization operation for face recognition. The main purpose of face alignment is to eliminate unwanted intra-class variations by aligning the image toward some normative shapes or constructions. In the prior art, face alignment is performed only according to a fixed template.

FIG. 1A is a schematic diagram of a prior art face recognition operation including training (the left side flowchart of FIG. 1A) and recognition (the right side flowchart of FIG. 1A) in which the same fixed template is used for both of training and recognition. In the training operation, a face angle in a face picture for training is calculated firstly, and then a predetermined fixed template (a frontal face image template) is selected for aligning the face picture, specifically, the face angle in the face picture is aligned towards the face angle of the frontal face template so that a model is trained based on the aligned face picture. In the recognition operation, the predetermined fixed template is selected to align the face picture to be recognized, specifically, the face angle in the face picture is aligned toward the face angle of the face template, and then a trained model is applied to the aligned test pictures to extract features therefrom, thereby determining face features in the pictures.

Figure 1B:
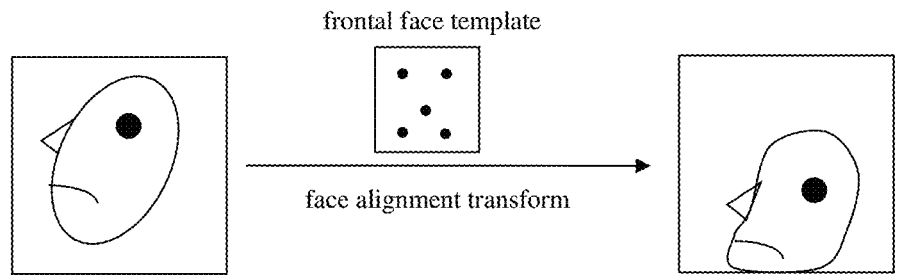

In the conventional face alignment method, face pictures (often both a training picture and a test picture) are aligned toward the same fixed template (for example, a frontal face template). In this way, the intra-class variance will become smaller, but a larger noise (distortion) will be introduced. For a face picture with a larger angle, especially the fully-lateral face picture shown on the left side of FIG. 1B, a large geometric distortion occurs during the alignment process, as shown in the picture on the right side of FIG. 1B. Such distortion can increase the image distortion, causing the accuracy of the face recognition model to degrade.

The present disclosure provides improved object image normalization, in which an optimized normalized template is adaptively determined in accordance with attributes of object images (such as training images) themselves for normalizing an image, such that the determined normalized template can improve both intra-class similarity and image alignment distortion at the same time, whereby by means of such normalized templates, optimized normalized images can be obtained, thereby improving a model to be formed and face recognition results.

The basic concept of the present disclosure will be outlined below with reference to FIGS. 2A-2C. A scheme of the present disclosure will be briefly described below by taking face angle as an example of attribute, wherein as an example, training images are divided into four groups according to face angle values, and four templates are generated based on such grouping to constitute a template set.

Figure 2A:
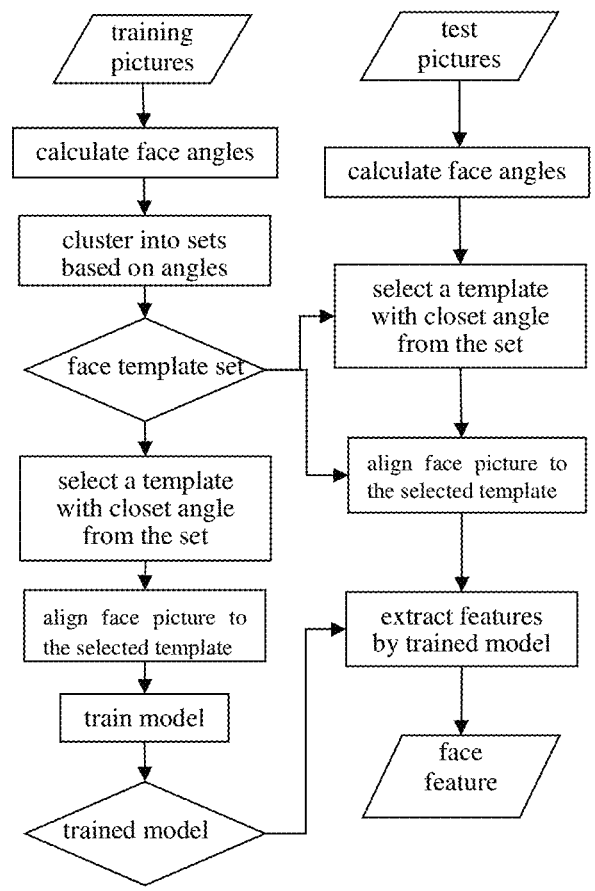
FIG. 2A, 2B, 2C are schematic diagrams of face recognition in accordance with the present disclosure.
Figure 2B:
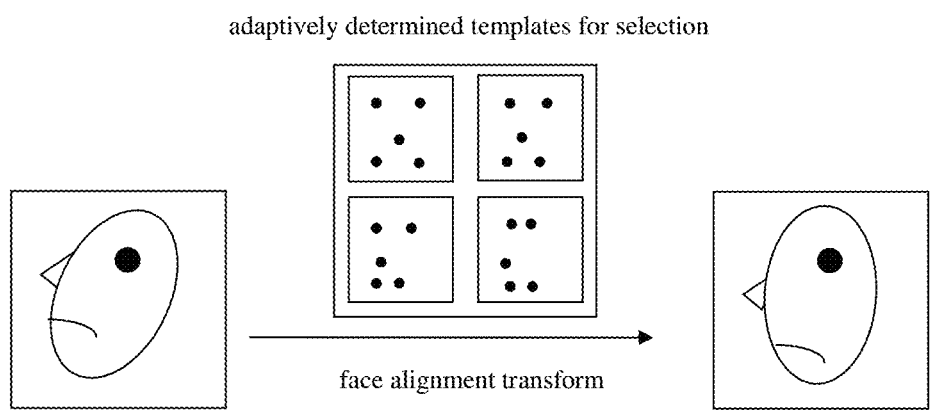

FIG. 2A shows a schematic flow chart of a face recognition operation according to the present disclosure, including training (left side flowchart of FIG. 2A) and recognition (the right side flow chart of FIG. 2A), where an optimized template can be adaptively determined by referring to face angles in the training images for training and recognition. In the training operation, the face angles in the training face pictures are firstly calculated, and then the face pictures are clustered into a predetermined number of sets based on the face angle values, thereby determining corresponding predetermined number of face templates as a face template set, and then for a face picture, a template with the closest angle is selected from the face template set as a corresponding template for alignment, thereby a model can be trained based on the aligned face pictures. In the recognition operation, for a face picture to be recognized, a template with the closest angle is selected from the face template set as the corresponding template for alignment, and then the trained model is applied to the aligned picture to extract features therefrom. Thereby, face features in the picture are determined.

The technical solution of the present disclosure adaptively creates face templates with different angles, so that faces with different angles can be assigned face templates which are more suitable for their recognition, so that any distortion and noise caused by face alignment can be reduced as much as possible on the premise that the intra-class similarity is not reduced, therefore the accuracy of face recognition can be greatly improved. As shown in FIG. 2B, for a face image with a larger angle, such as a fully-lateral face picture as shown on the left side of FIG. 2B, by selecting a corresponding template from the adaptively determined template set including the predetermined number of templates, the distortion occurring in the alignment process is greatly reduced, as shown in the picture on the right side of FIG. 2B, whereby object recognition can be improved.

Figure 2C:
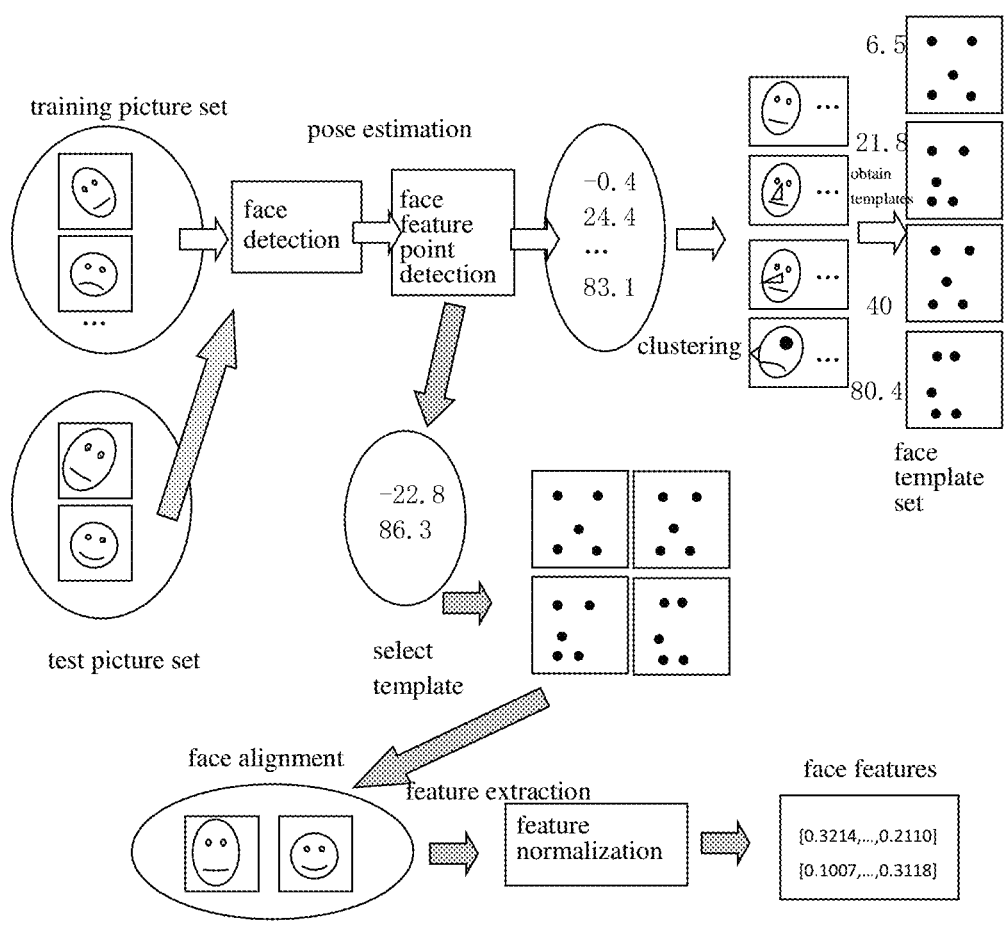

FIG. 2C is a schematic diagram showing a face recognition operation according to the present disclosure. Where, face pose estimation (for example, including face detection and face feature point detection) is performed in a training image set having a large number of training face images to obtain face angles of the training face images, such as individual numbers −0.4, 24.4, . . . , 83.1 indicating face angle values as shown in the figure. Then, the training face images are clustered according to the estimated face angles to determine a predetermined number (four) of templates, each of which corresponds to an angle value of 6.5, 21.8, 40, and 80.4, respectively. Then, for a set of test images containing face images to be recognized (e.g., two images as shown in the figure), pose estimation is also performed (e.g., may be the same as that for the training image set as described above, including face detection and face feature point detection) to know face angles of face images to be recognized, that is, −22.8, 86.3 as shown in the figure, and an appropriate template is selected from the determined template set for aligning the to-be-recognized images, thereby features are extracted from the aligned images and then normalized, to obtain features of the images for face recognition.

The technical concept of object recognition of the present disclosure has been described above by taking face recognition as an example, wherein a face angle is an example of an object attribute, four face templates are examples of adaptively determined templates, and face angle alignment is an example of object image normalization. It should be noted that the technical idea of the present disclosure can be equally applied to other types of object recognition without being particularly limited.

Embodiments according to the present disclosure will be described in more detail below with reference to the accompanying drawings. In particular, embodiments of the present disclosure relate in particular to improved determination of normalization template, improved determination of object recognition model, and improved object recognition.

The First Embodiment

A first embodiment according to the present disclosure will be described below with reference to the accompanying drawings. A first embodiment of the present disclosure relates to generation of a normalization template in accordance with an embodiment of the present disclosure.

As described above, object image normalization is very important in object recognition, and the improvement of object image normalization depends on determination of a template for normalization. This embodiment of the present disclosure provides an improved determination of template for object image normalization. In particular, according to this embodiment of the present disclosure, a template is adaptively determined with reference to attribute distribution of training images, so that the training images can be more optimally normalized. The "training images" herein refer to images in a reference image set for determining a normalization template, and the reference image set is preset by a user or a system.

The term "adaptive" generally means that generation of a template is based on training images themselves which are the basis of training. In particular, a template for object image normalization is generated in accordance with the training images themselves, which can be better suitable for the training images so that the training images can be more properly normalized.

Object image normalization means adjusting attributes of an object image according to corresponding attribute templates so as to make it more helpful for object recognition. Depending on the attributes of the object image, templates can be appropriately determined, whereby normalization can be operated accordingly.

In the present disclosure, an attribute of an object image may be an attribute that can be quantizable and measurable. This attribute can be either discrete or continuous.

As an example, an attribute of an object image may be at least one selected from a group comprising an image attribute and an object attribute. As another example, the image attribute may be at least one selected from a group comprising image resolution, image luminance, and image blur. The object attribute may be at least one selected from a group comprising yaw angle and pitch angle of the object in the image, and a proportion of the object in the image.

As an example, when the attribute of the object image is an image attribute, such as the image resolution, the image luminance, or the like, the template may be determined with reference to the image attributes of respective images, whereby normalization may correspond to the image attributes of the object image, such as resolution, luminance, etc., being adjusted to specific image attributes in accordance with the image attribute templates thus determined, so that object recognition can be performed based on the adjusted image attributes.

As another example, in a case where the attribute of the object image is the pose and the orientation angle of the object in the image, such as the yaw angle and the pitch angle (vertical orientation angle), etc., an orientation angle template may be determined with reference to orientation angles of individual images, so that the normalization can correspond to an object alignment operation according to the template thus determined, that is, transforming the orientation of the object into a specific pose or orientation, thereby performing object recognition based on the transformed pose or orientation.

As another example, when the attribute of the object image is the object proportion (that is, the proportion of the object in the image, which may also be referred to as the proportion of the object occupying in the image), an object proportion template may be determined by referring to the object proportions of individual images. Normalization may correspond to adjusting the object proportion of the object image to a specific object proportion according to the template thus determined, thereby performing object recognition based on the adjusted object proportion.

In one implementation, for a plurality of training images, attribute values of each training image are determined and the training images are appropriately grouped according to the attribute values, so that a suitable template can be determined for each group to form a template set, and the obtained template set can be used to normalize the images subsequently.

Figure 3:
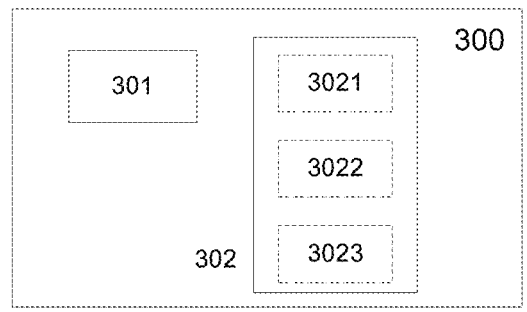
FIG. 3 illustrates a template generation apparatus according to a first embodiment of the present disclosure.

FIG. 3 illustrates a template generation apparatus according to a first embodiment of the present disclosure. The template generation apparatus includes: an attribute distribution determination unit 301 configured to determine distribution of a specific attribute in a plurality of images; and a template determination unit 302 configured to adaptively determine a template set from the plurality of images according to the determined distribution of the specific attribute of the plurality of images. Wherein, the determined template set will be used for image normalization.

As described above, an attribute of an object image may be at least one selected from a group comprising an image attribute and an object attribute. As another example, the image attribute may be at least one selected from a group comprising image resolution, image luminance, and image blur. The object attribute may be at least one selected from the group comprising yaw angle, pitch angle, pose, and proportion of an object in the image.

According to one embodiment, the attribute distribution of an image is a distribution within a predetermined range. Specifically, in view of the trade-off between calculation accuracy and overhead, etc., after the attribute distribution of the image is acquired, the acquired attribute distribution of the image may be mapped into a predetermined range, and a template can be determined in the predetermined range.

For example, in a case where the attribute of an image is face orientation angle, the distribution of the face orientation angles can usually be determined within a range of [−90°, 90°]. As an example, for simplification, the face orientation angles in the image may be mapped into [0, 90°] to determine the distribution of the face orientation angles. The above is only an example, and the range corresponding to each attribute can be set as appropriate depending on characteristics of the attribute itself.

Based on the distribution of image attributes thus determined, a predetermined number of templates can be determined from a plurality of images to form a template set for normalization.

According to an embodiment, the number of templates may be preset. For example, it may be preset by the system or the user based on historical data and experience.

As an example, the number of templates may be appropriately set depending on scenarios in images. For example, depending on the application scenario of image recognition, the attributes of the image can be particularly normalized.

For example, in a case where the image attribute is face angle, and the application scenario of the image recognition is the scenario of criminal photo recognition, since it is often necessary to recognize only the frontal photo and lateral photo (i.e., −90° or 90° lateral photo) of the face in this scenario, the face orientation angle often needs to be only aligned to the two orientations, so that the required templates are only a frontal template and the 90° lateral template.

For example, in a case where the image attribute is a face angle, and the application scenario of the image recognition is customs entry check, since it is often necessary to recognize only the frontal photo of the face in this scenario, the face orientation angle often needs to be only aligned to this orientation, so that the required template is only a frontal template.

According to one embodiment, the number of templates may be optimally determined based on input training images.

In the image normalization operation, the performance of image normalization shall consider not only intra-class variation/difference loss, but also noise introduced during image normalization, such as artifacts caused by similarity transform or affine transform. Both relate to the number k of templates for image normalization. Assume that the intra-class difference loss is d(k), the artifact loss caused by the transform performed by the image normalization is (k), as a result, the total image normalization loss is Loss(k)=d(k)+a(k). Therefore, it is necessary to find an optimal number of templates for minimizing the loss during image normalization. This minimization process is as follows:

$$k^* = \underset{k}{\mathrm{argmin}} \mathrm{Loss}(k)$$
$$= \underset{k}{\mathrm{argmin}}(d(k) + a(k)).$$

Where k indicates the number of templates.

According to an implementation, the predetermined number is determined by: performing N clustering for the plurality of images respectively, wherein for the Mth clustering, determining M templates; normalizing each of a plurality of training images according to a corresponding template in the M templates accordingly, and training a training model for the clustering according to the normalized images, and the number of templates corresponding to the model with the highest recognition accuracy among obtained N training models is selected as the predetermined number, where N is an integer greater than or equal to 1, and M is an integer greater than or equal to 1 and less than or equal to N.

Thereby, an optimal number of templates can be determined for the input training images, and at the same time, optimal normalization templates can be determined.

The determination of the optimal number of templates will be briefly described below with face alignment as an example of image normalization.

Face alignment needs to consider not only intra-class variations, but also noise introduced by the alignment operation. When all face images are aligned to a single frontal shape, the intra-class similarity is greatest, i.e., the intra-class difference loss d(k) is minimum, but the noise introduced in the alignment operation, i.e., the artifact loss a(k), will also be very large, especially for faces with big poses. Conversely, as the number of alignment templates increases, the intra-class difference d(k) increases, but the face alignment artifact a(k) decreases. Therefore, it is necessary to find a specific number of templates so that when all face images are aligned, distortion will be as little as possible, while the intra-class similarity after alignment is as large as possible. That is, it is necessary to find an optimal k value such that the total face alignment loss obtained by combination of d(k) and a(k) is minimized.

In operation, it is possible to first find a training image set with a wide distribution of poses and a large amount of data. As an example, a CASIA-WebFace data set can be selected that contains 10,575 objects for a total of 494,414 images. Then the number k of reference templates is determined.

Then, depending on attributes of the training images, the maximum number K of reference templates can be set. For example, since the distribution of face yaw angles can be substantially mapped within [0, 90°], the maximum number K can be set to 9. As another example, the distribution of face yaw angles may be mapped within [−90°, 90°], and the maximum number K may be set to 18.

Then, the training images are sequentially clustered by using a known clustering method in order of template numbers from 1 to K, whereby for each of the template numbers from 1 to K, a corresponding number of clusters can be determined. The clustering method can be, for example, a k-means method, as shown in the following equation:

$$\Theta = \mathrm{kmeans}(\{\theta\}_i^n)_{k=1}^K$$

Where $\Theta$ denotes a collection of aggregation centers, and K denotes the maximum number of templates, which may be 9. The purpose of K-means aggregation is to minimize the sum of the distances between features and cluster centers, so that the average loss in transforming face images with different poses to their respective nearest cluster centers is the lowest.

For each clustering, after determining a cluster center, the cluster center is taken as the center value of the corresponding template, and the images and the face marks having the same index as that of the cluster center are averaged to obtain a reference template. For k=1 to k=9, 9 different sets of reference templates can be generated.

Then, each set of reference templates can be applied to perform face image alignment for face recognition, thereby obtaining a corresponding face recognition performance. From the obtained multiple face recognition performances, it can be determined that the highest recognition performance is k=4, and the corresponding cluster center $\Theta=\{6.5°, 21.8°, 40.0°, 80.4°\}$ can be determined as the center value of the template.

From this, the most appropriate number of normalization templates and the values of individual templates can be determined.

According to one implementation, the number of templates thus determined can be used directly for determination of templates for subsequent training images. According to another implementation, the number of templates can be dynamically determined, whereby appropriate number of templates can be dynamically determined after receipt of subsequent training images. In this case, an optimal number of templates can be determined based on the subsequent training images or a collection of previous training images and subsequent training images as described above, thereby obtaining optimal reference templates for image normalization.

According to one implementation, after further receipt of new images, a new template set is determined from a plurality of images previously used for template determination and at least some of the received new images, and the number of templates corresponding to a specific attribute in the new template set is the same as or different from the number of templates corresponding to the attribute in the template set determined by the plurality of images.

According to one implementation, for a training image set, the images contained in the training image set may first be distinguished to determine which images are for a specific application scenario. And for those images for the specific application scenario, a template corresponding to the specific scenario is generated from the images belonging to the specific scenario according to distribution of a specific attribute in the images belonging to the specific scenario, where the number of templates may be preset.

Moreover, for images in the training image set other than those images for the specific application scenario, the method described above can be applied to determine the optimal template number and templates. Therefore, an appropriate template set can be finally determined.

According to an embodiment of the present disclosure, the template determination unit 302 may further include: a clustering unit 3021 configured to obtain a predetermined number of clusters from the plurality of images according to the distribution of the specific attributes in the plurality of images, and a template generation unit 3022 configured to generate one template for each cluster, wherein the predetermined number of generated templates constitute the template set.

According to an embodiment, the template generation unit 3022 is configured to: calculate an average coordinate for object marks of all object images in a cluster; calculate an average attribute value of the attribute values of all object images in the cluster; and utilize the calculated average coordinate and average attribute value to generate a template for the cluster.

Preferably, the cluster obtaining operation is performed such that for each cluster, the sum of differences between the attribute values of respective images belonging to the cluster and the attribute value of the center of the cluster is the smallest. As an example, clustering can be performed by using one of several clustering methods known in the art, such as K-means, general clustering, and the like.

Preferably, for each cluster, the attribute values of the template generated for the cluster are equal to that of the center of the cluster, such that each center represents a template of an attribute. Preferably, the center of the cluster is equal to the mean value of the attribute values of all images belonging to the cluster. As an example, in a case where the attribute is a face orientation angle, the corresponding template corresponds to a face orientation map summarized by the face orientations in each cluster. Specifically, in the case where the attribute is a face orientation angle, the center of each cluster is the mean value of the orientation angle values of all images belonging to the cluster, and the mean value of face feature points of all images belonging to the cluster is calculated, and thereby the face template for each cluster is obtained.

The template determination as described above can be extended to a case of multiple attributes.

According to an embodiment, the attributes include at least one attribute, and the template determination unit 302 further includes: a template subset determination unit 3023 configured to, for each of the at least one attribute, determines a template subset corresponding to the attribute according to distributions of the attribute in the plurality of images, wherein the template set is constructed from the at least one template subset.

In particular, operations similar to the template determination/generation operations as described above may be performed during the determination of template subset, and the number of templates in each template subset may also be determined as previously described.

It should be noted that the above-mentioned respective units are only logical modules divided according to the specific functions they implement, and are not intended to limit specific implementations, for example, may be implemented in software, hardware or a combination of software and hardware. In actual implementation, the various units/modules/subunits described above may be implemented as separate physical entities or may be implemented by a single entity (e.g., processor (CPU or DSP, etc.), integrated circuit, etc.). Moreover, the various units described above are shown in dashed lines in the figures to indicate that the units may not actually exist, and that the operations/functions they implement may be implemented by the processing circuit itself.

Figure 4:
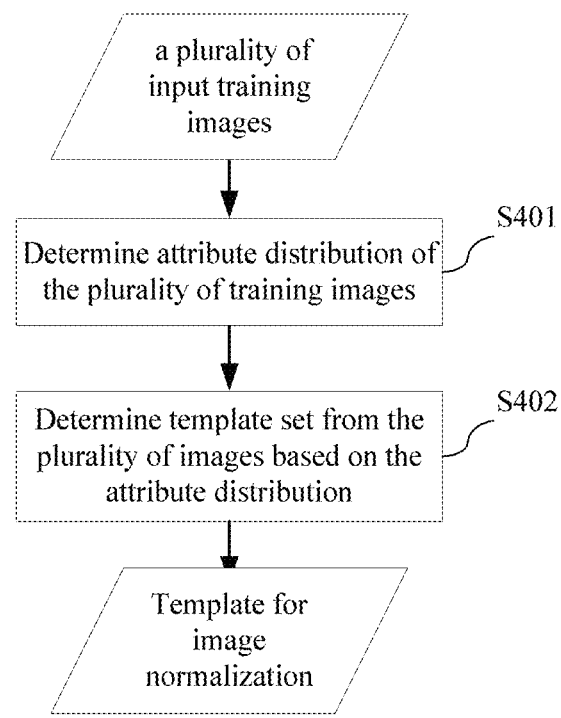
FIG. 4 illustrates a template generation method according to a first embodiment of the present disclosure.

FIG. 4 illustrates a template determination method according to a first embodiment of the present disclosure.

In step S401 (attribute distribution determination step), distribution of a specific attribute in a plurality of images is determined.

In step S402 (template determination step), a template set is adaptively determined from the plurality of images according to the determined distribution of the specific attribute of the plurality of images. Wherein, the determined template set will be used for image normalization.

Preferably, the template determination step may further include: a clustering step of obtaining a predetermined number of clusters from the plurality of images according to the distribution of the specific attributes in the plurality of images, and a template generation step of generating one template for each cluster, wherein the predetermined number of generated templates constitute the template set.

According to an embodiment, the template generation step may further include: a step of calculating an average coordinate for object marks of all object images in the cluster; a step of calculating an average attribute value of the attribute values of all object images in the cluster; and a step of utilizing the calculated average coordinate and average attribute value to generate a template for the cluster.

In a case where the attribute includes at least one attribute, the template determination step may further include: a template subset determination step of, for each of the at least one attribute, determining a template subset corresponding to the attribute according to distributions of the attribute in the plurality of images, wherein the template set is constructed from the at least one template subset.

The method according to this embodiment of the present disclosure may be performed by units in the template generation apparatus of the embodiment of the present disclosure, or may be performed by other processing apparatuses.

Figure 5:
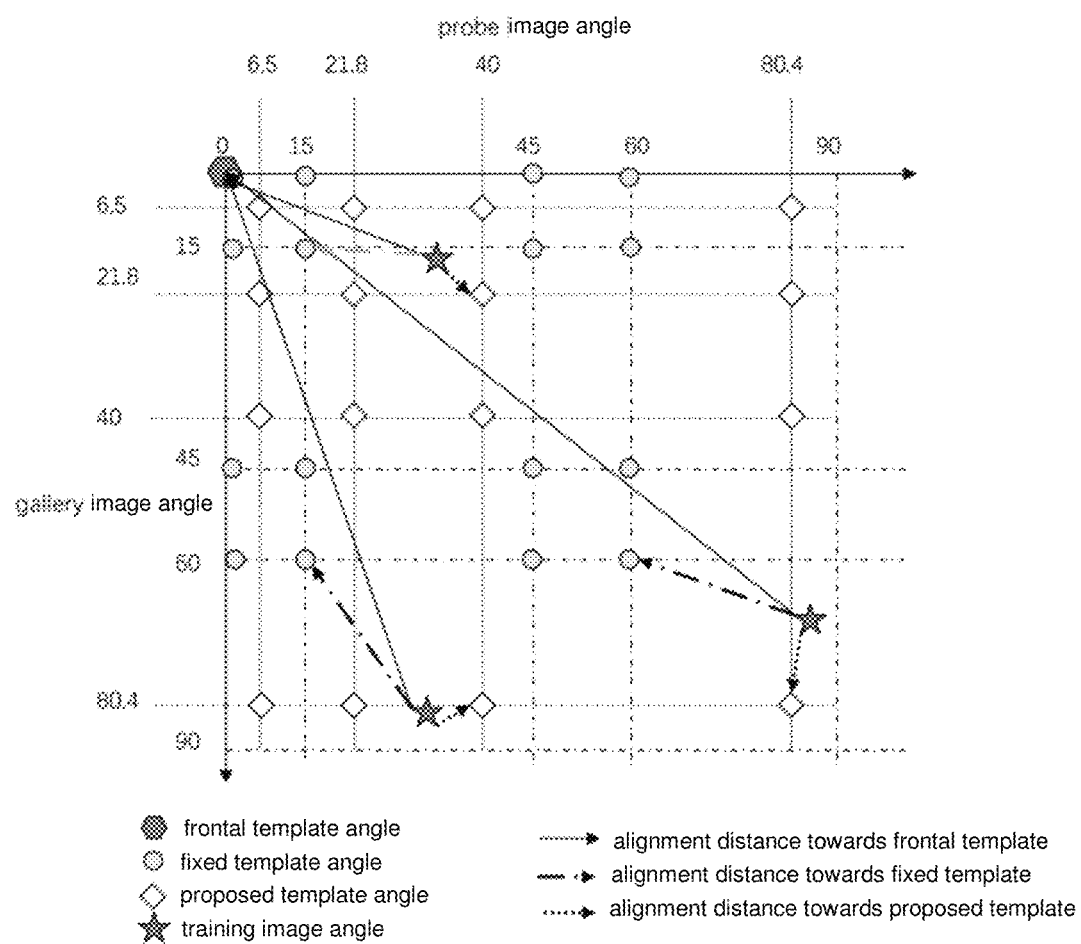
FIG. 5 illustrates a comparison of an adaptive template set in accordance with a first embodiment of the present disclosure with a prior art template.

FIG. 5 illustrates a comparison of an adaptive template set in accordance with a first embodiment of the present disclosure with prior art templates. The horizontal axis and the vertical axis respectively indicate angles of the tested (to be recognized) probe images and the gallery images.

In this figure, the hexagons and circles in the upper left corner respectively indicate fixed templates used in the prior art, wherein the hexagon in the upper left corner represents a frontal face template in the prior art to which all images are aligned, which corresponds to degree 0, the gray circles represent fixed templates with predefined angles in the prior art, corresponding to angle values of 0, 15, 45 and 60, respectively. In addition, white diamonds represent templates that are adaptively determined by embodiments of the present disclosure, with angles of 6.5, 21.8, 40, and 80.4, respectively. The five-pointed stars represent angles of the images to be recognized.

In addition, in this figure, arrows between the five-pointed stars and other marks with different shapes indicate the alignment of images to be recognized to which the five-pointed stars correspond towards the alignment templates, wherein the solid arrow indicates the alignment towards the fixed frontal face template, long dot-dashed arrows indicate the alignment towards a template having a predefined angle, and the dashed arrows indicate the alignment towards templates that are adaptively determined in accordance with embodiments of the present disclosure. The distance represents the distance of the alignment movement, which can be represented by the angular difference between the image and the template, and can also be equivalent to the alignment overhead. The smaller the distance is, the smaller the corresponding alignment overhead is, and the smaller the distortion introduced in the alignment transform is. As can be seen from FIG. 5, the average moving distance of the test picture to the template proposed by the present disclosure is minimal, because the face angle of the template can be adaptively determined according to embodiments of the present disclosure, and then the most suitable template can be selected for the test picture.

Because the clustering method is utilized to find templates with more suitable poses, when a test image is aligned toward a selected adaptive template, the distortion produced in the alignment is minimal. As mentioned above, the essence of clustering is to minimize the sum of distances between each sample and the cluster center. The distance here means the difference in angle between the image before alignment and its specified template. If this sum is the smallest, which means that the sum of the angular differences between all pictures and their corresponding templates is the smallest, the noise caused by the alignment is also the lowest.

An exemplary implementation of the present embodiment will be described in detail below taking a person's face recognition as an example.

[Template Determination with Respect to the Face Yaw Angle]

Figure 6:
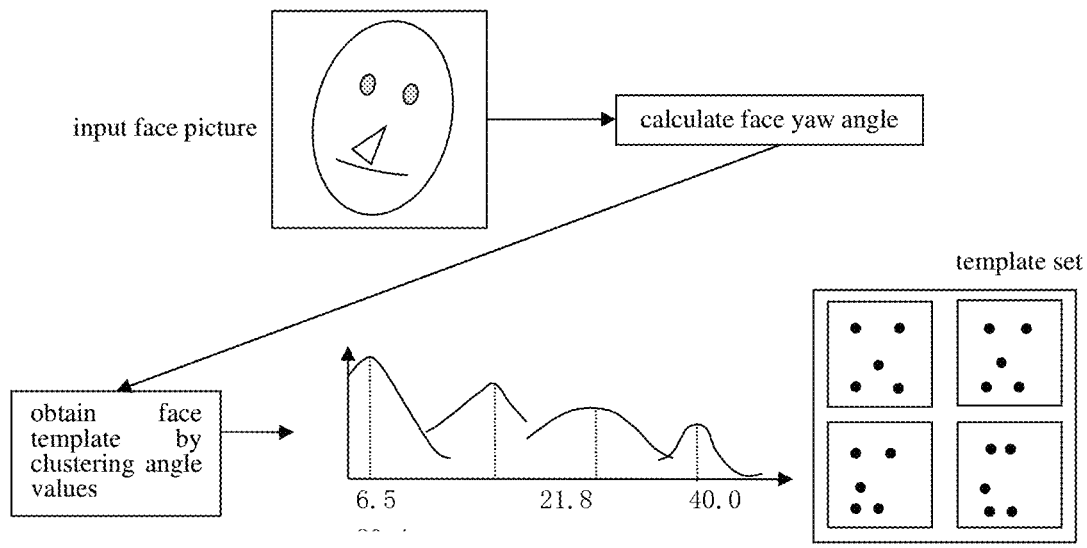
FIG. 6 illustrates a schematic diagram of determination of a template set with respect to face yaw angle in accordance with a first embodiment of the present disclosure.

FIG. 6 shows a schematic diagram of template determination for face recognition, in accordance with an embodiment of the present disclosure. Among them, the face of a person is regarded as an object to be recognized, and the face yaw angle is regarded as an attribute of the object.

First, we calculate face angles of pictures in a training set. We can use various face angle calculation algorithms to obtain angle values, such as 3DMM-based methods, or deep learning-based methods, and so on.

After having obtained the face angles, we use the angle values as the feature for clustering the entire set and cluster it into four groups. Here, the number 4 of clustering groups may be predetermined, or may be an optimal number determined by performing a plurality of tests on the training images as described above.

By calculating a mean value of positions of face feature points in face images belonging to the same cluster, a face template for each cluster can be obtained. At this point, the cluster center is the face angle value of this template.

In this step, the angle value of each picture obtained in the previous step is input. Since the yaw angle range of the face is [−90°, 90°], we can use the values in this range as the feature of the cluster. Or, a face with a negative angle can be flipped horizontally. In this way, the angle range of the face images is [0, 90°], and then the values of this range are used for clustering. The method for clustering the angle values can be K-means, general clustering, and so on. After that, all face images belonging to the same cluster are obtained, and the mean value of the positions of the face feature points in the face images are calculated, that is, the face template of each cluster can be obtained. At this point, the cluster center is the face angle value of this template. The angle values of the clustered four templates are $\{6.5°, 21.8°, 40.0°, 80.4°\}$.

It is also possible to directly use the angle values of [−90°, 90°] as a feature for clustering. Compared with the feature of [0,90°], this method takes into account natural distribution of the images and the angle values cover a wider range, so the trained model can achieve a better effect. It should be noted that in this range of angles, the number of templates to be generated (i.e., the number of clustering groups) may be four as that in the range of [0, 90°], or may also be an optimal number determined by performing a plurality of tests on the training images in this range as described above, and may be, for example, more than four, such as seven.

[Template Determination with Respect to Face Pitch Angle]

Figure 7:
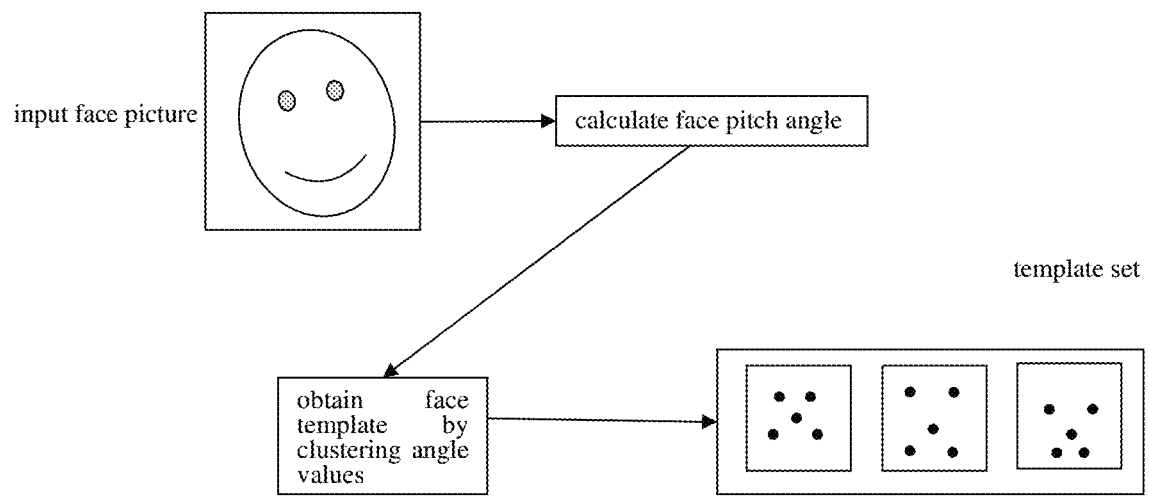
FIG. 7 illustrates a schematic diagram of determination of a template set with respect to face pitch angle according to a first embodiment of the present disclosure.

FIG. 7 shows a schematic diagram of template determination for face recognition, in accordance with an embodiment of the present disclosure. Among them, the face of a person is regarded as an object to be recognized, and the face pitch angle is regarded as an attribute of the object.

The above-described embodiment described by taking the person's face yaw angle as an example can be similarly applied to a person's pitch angle, and the clustering can be similarly performed for the face pitch angles and a corresponding template set can be determined.

Specifically, for input face images of a training set, various face pitch angle calculation algorithms may be used to obtain angle values, such as a 3DMM based method, or a deep learning based method, or the like. The images in the training set are clustered by using the pitch angle value as a feature. Since the range of the face pitch angles is [−90°, 90°], the angle values are clustered in this range, and the method can be K-means, general clustering, and the like. After that, a face template for each cluster can be obtained by obtaining all face images belonging to the same cluster, and calculating a mean value of positions of their face feature points. At this point, the cluster center is the face angle value of this template.

It should be noted that since the pitch angle is somewhat different from the yaw angle, the number of templates may not be the same as that in the case of yaw angle. As shown in FIG. 7, three adaptive templates are constructed for the pitch angle.

Compared with the case of considering the yaw angle, this implementation takes into account the face pitch angle, so that wider face poses can be encompassed, and a better face recognition effect can be obtained for a practical scenario, such as a surveillance scenario.

[Template Generation in Consideration of Picture Scenario]

Figure 8:
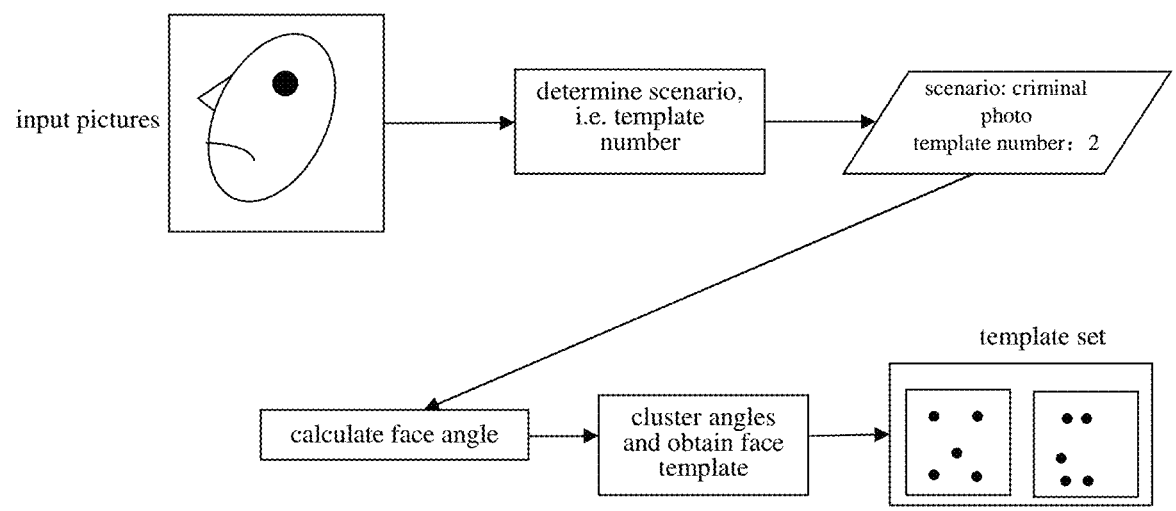
FIG. 8 illustrates a schematic diagram of determination of a template set with respect to face yaw angle in consideration of an application scenario according to the first embodiment of the present disclosure.

FIG. 8 illustrates a schematic diagram of template determination for face recognition in consideration of a test scenario, in accordance with an embodiment of the present disclosure. Among them, the face of a person is regarded as an object to be recognized, and the face yaw angle is regarded as an attribute of the object.

First, we need to determine the test scenario and choose a corresponding number of templates. The scenarios can be distinguished as natural scenario, surveillance scenario, ID photo, criminal photo, and the like. The number of templates corresponding to the four scenarios is 4, 4, 1, and 2, respectively.

After that, all pictures that conform to the test scenario are selected from the training set. After obtaining the training pictures that conform to the test scenario, the face angles of such pictures are calculated.

After having obtained the face angles, we use the angle value as a feature for clustering the entire set and cluster it into clusters whose number is the same as the number of templates corresponding to the scenario. By calculating a mean value of positions of face feature points in all face pictures belonging to the same cluster, a face template for each cluster can be obtained. At this point, the cluster center is the face angle value of this template.

It should be noted that in this implementation of this embodiment, the input picture may also be directly a picture that conforms to the test scenario. In this case, since the number of templates corresponding to the test scenario is fixed, it is not necessary to determine the number of templates in the operation. Instead, after having obtained the face angles in the pictures, the clustering is directly performed according to the corresponding number of templates.

This embodiment is able to train more appropriate templates with respect to the test scenario. For example, if the test scenario belongs to ID photo, since the ID photo only has a frontal face, only a face angle template with 0 degree is needed. If the test scenario belongs to criminal photo, since the criminal photo only has a frontal face and a fully-lateral face, only face angle templates with 0 degree and 80.4 degree are needed. In this embodiment, since the number of templates to be calculated is not fixed as 4, the amount of calculation is reduced when calculating the face template. Therefore, it will be faster than the previous embodiment.

It should be noted that the template determination operation of this embodiment as described above can be similarly applied to any other attribute of the object image.

[Template Determination with Respect to More Than One Attribute]

According to one implementation of the present embodiment, the attributes for object recognition and template determination may include at least one attribute, such as the image attributes and object attributes described above, and the like.

First, we calculate values of each of at least one attribute of the face in the training set pictures. Such attributes can be the face yaw angle, the face pitch angle, the degree of blur, the brightness, the proportion of the object in the image, and so on.

After having obtained the attribute values of the pictures, we use the values as features to cluster the entire set. The range of each attribute is different, so such clustering operation is also performed for different attributes in different ranges.

For example, the brightness and blur of the image may be in a range of [0, 1]; the image resolution may be in a range of [1, 1000]; the yaw angle and the pitch angle of the face may be in a range of [−90°, 90°]; and the face proportion in the image can be in a range of [0.3, 1].

Thus, for each attribute, a template subset corresponding to the attribute can be determined, and the number of templates in each template subset can be predetermined as described above, or be optimally determined based on the attribute of the object pictures. The center of each template in each template subset corresponds to a mean value of the attribute feature values of the training pictures included in the corresponding cluster.

Thus, a total template set can be obtained from at least one template subset determined for at least one attribute, for image normalization and object recognition.

Second Embodiment

A second embodiment according to the present disclosure will be described below with reference to the accompanying drawings. A second embodiment of the present disclosure is directed to a model generation apparatus and method according to the present disclosure.

In a second embodiment of the present disclosure, training images can be normalized with reference to optimal templates previously generated, thereby generating an improved model for image object recognition.

Figure 9:
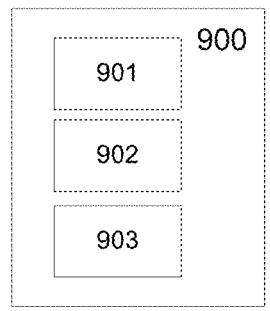
FIG. 9 illustrates a model generation apparatus according to a second embodiment of the present disclosure.

FIG. 9 shows a model generation apparatus in accordance with the present disclosure. The apparatus 900 includes a template set generation unit 901 configured to apply the method according to the first embodiment to a plurality of training images including the object to generate a template set; a normalization unit 902 configured to normalize each of the plurality of training images according to its corresponding template in the template set; and the model training unit 903 configured to perform training based on the normalized plurality of training images to determine an object recognition model.

Thus, by utilizing the template adaptively determined from training images by the first embodiment of the present disclosure, the training images can be more appropriately normalized, instead of all being always normalized according to a single fixed template. Therefore, in the normalization process, the geometric distortion of the object image is reduced, whereby a more accurate object recognition model can be generated, which in turn improves the object recognition result.

According to an embodiment of the present disclosure, the template corresponding to a training image refers to a template in the template set whose center value has a smallest difference from the attribute value of the image. For example, in a case where the face orientation angle is an attribute value, a template matching a face image refers to such a template that the difference between the angle value of the template and the angle value of the face image is the smallest.

According to an embodiment of the present disclosure, the normalization unit 902 is configured to normalize an image of a specific scenario in the plurality of training images according to a template corresponding to the specific scenario.

According to an embodiment of the present disclosure, in a case where the image has at least one attribute value, a template corresponding to the training image refers to such a template in the template set that the statistical value of differences between the center value of each attribute of the template and at least one attribute value of the image is the smallest, wherein the statistical value is one selected from a group comprising mean, weighted mean, and median of the difference.

Thus, for each training image, an optimal template can be selected from a template set including at least one template subset formed for at least one attribute, as a corresponding template. Further, when the statistical value is calculated as described above, the weight can be added to each attribute in consideration of the importance of each attribute, so that the weighted statistical value can be obtained.

According to an embodiment of the present disclosure, the normalization unit 902 is configured to: in a case where the template set includes template subsets corresponding to at least one attribute, perform the following operations for the at least one attribute in a specific order: for each attribute, selecting, from a template subset corresponding to the attribute, a template whose attribute values of the attribute have the smallest difference from that of the training image, as a template corresponding to the training image, so as to perform normalization on the training image with respect to the attribute.

Therefore, for each training image, an optimal template can be selected for each attribute separately, so that optimal template attribute values can be obtained according to the attribute values of optimal templates for each attribute, thereby the training images can be normalized based thereon.

The specific order of respective attributes can be arbitrary, as long as all attributes have been processed. Preferably, the templates can be selected in a specific attribute order in accordance with at least one of the detected application scenario, the importance of the attribute, and the like.

According to one implementation, the specific order is an order in which the image attributes first and the object attributes later.

The foregoing describes a case for at least one attribute, in which a template set including at least one template subset is first determined according to training images, and then an optimal template is selected from the template set for normalization of the training images.

According to an implementation of the embodiment, in a case where there exists at least one attribute, firstly, for one attribute(first attribute), a template set can be determined and the training images are normalized with respect to the template set, and then based on the normalized training images, for a later attribute (second attribute), a template set can be determined and the normalized training images can be further normalized with respect to the template set, and so on, until all of the object attributes have been processed.

The processing order here may be arbitrary or may be a specific order.

It should be noted that the above-mentioned respective units are only logical modules divided according to the specific functions they implement, instead of being intended to limit specific implementation. For example, various unit may be implemented in software, hardware or a combination of software and hardware. In actual implementation, the various units/modules/subunits described above may be implemented as separate physical entities or may be implemented by a single entity (e.g., a processor (CPU or DSP, etc.), integrated circuit, etc.). Moreover, the various units described above are shown in dashed lines in the figures to indicate that the units may not actually exist, and that the operations/functions they implement may be implemented by the processing circuit itself.

Figure 10:
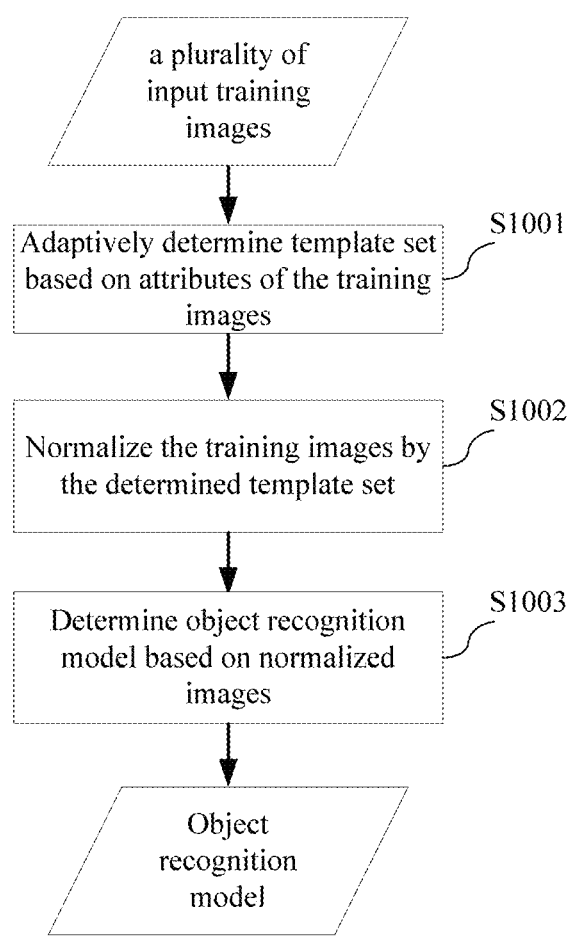
FIG. 10 illustrates a model generation method according to a second embodiment of the present disclosure.

FIG. 10 illustrates a model generation method in accordance with the present disclosure.

In step S1001 (template set generation step), the method according to the first embodiment is applied to a plurality of training images including the object to generate a template set.

In step S1002 (normalization step), each of the plurality of training images is normalized according to its corresponding template in the template set.

In step S1003 (model training step), training is performed based on the normalized plurality of training images to determine an object recognition model.

According to an embodiment of the present disclosure, in the normalization step S1002, an image of a specific scenario in the plurality of training images is normalized according to a template corresponding to the specific scenario.

According to an embodiment of the present disclosure, in the normalization step S1002, in a case where the template set includes template subsets corresponding to at least one attributes, the following operations are performed for the at least one attribute in a specific order:

for each attribute, selecting, from a template subset corresponding to the attribute, a template whose attribute values of the attribute having the smallest difference from that of the training images, as a template corresponding to the training images, so as to perform normalization on the training image with respect to the attribute.

Preferably, the specific order is an order in which the image attributes first and the object attributes later.

The method according to this embodiment of the present disclosure may be performed by units in the template generation apparatus of the embodiment of the present disclosure, or may be performed by other processing apparatuses.

Figure 11:
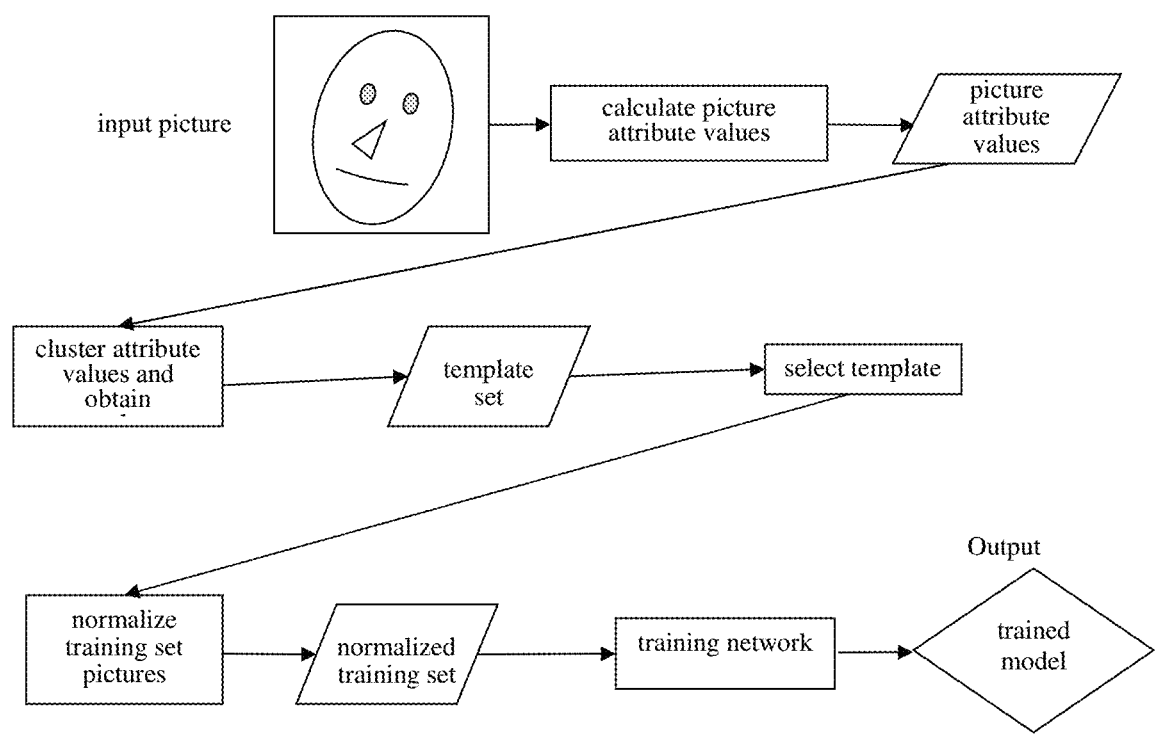
FIG. 11 illustrates a schematic diagram of a model generation operation according to a second embodiment of the present disclosure.

FIG. 11 schematically illustrates a schematic diagram of model generation for face recognition, in accordance with an embodiment of the present disclosure. As an implementation, the model may be a model representing a recognition network (e.g., a deep learning neural network) to which the aligned face images will be input, whereby a feature vector of the object will be extracted from the input aligned images for object recognition use.

An exemplary implementation of the present embodiment will be described in detail below by taking a person's face recognition as an example.

[Model Generation with a Face Attribute as an Example]

Figure 12:
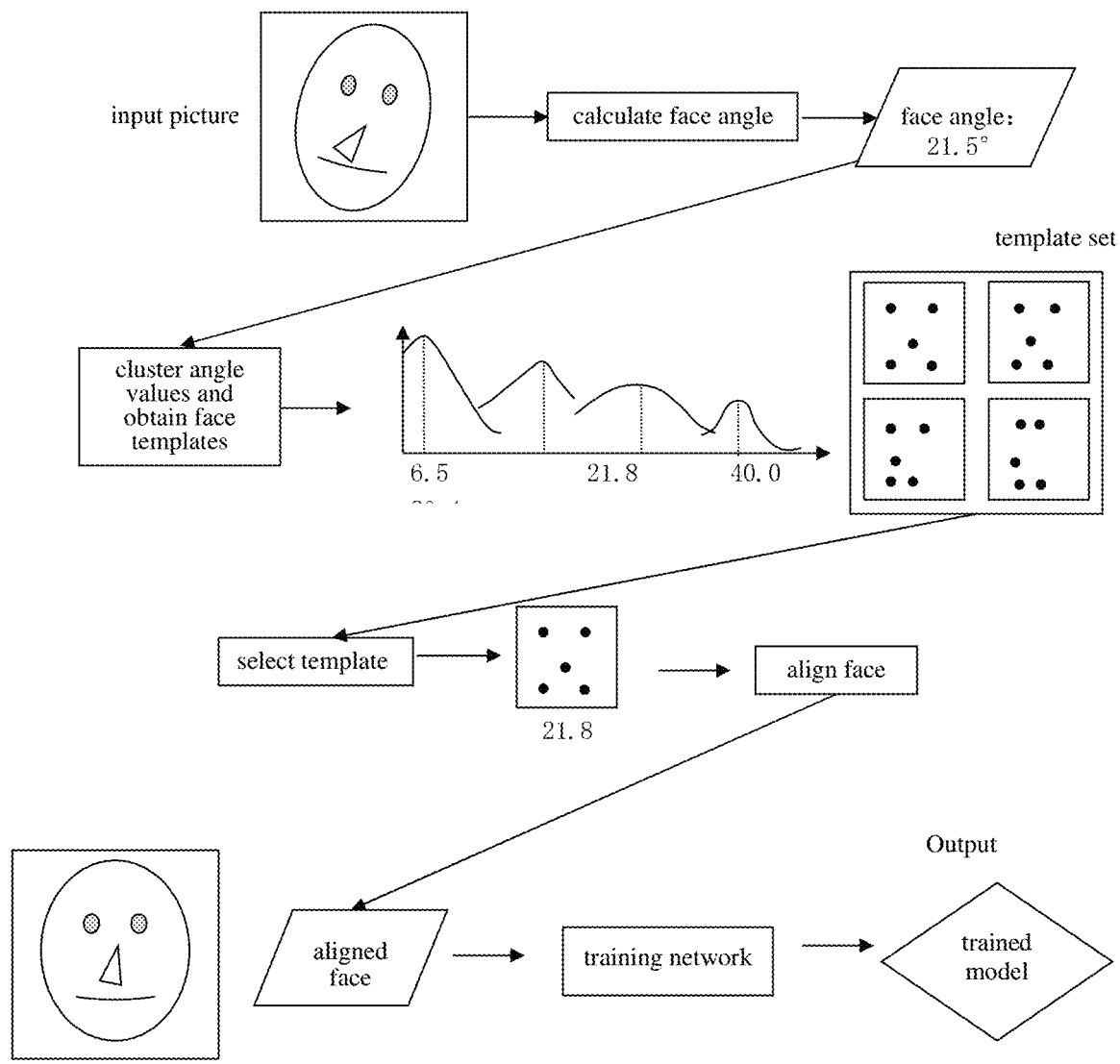
FIG. 12 illustrates a schematic diagram of a model generation operation with respect to face yaw angle according to a second embodiment of the present disclosure.

FIG. 12 shows a schematic diagram of model generation for face recognition, in accordance with an embodiment of the present disclosure. Among them, the face of a person is regarded as an object to be recognized, and the face yaw angle is regarded as an attribute of the object.

First, a template set is generated as in the first embodiment. The clustered four templates have angle values {6.5°, 21.8°, 40.0°, 80.4°}.

After obtaining face templates, we select a template from these templates for each training picture, so that the difference of angle values between this picture and its selected template is smallest. In this step, images in the training set and the face template obtained in the previous step are input. For a face picture, differences between face angle values of the face picture and angle values of all templates are calculated, and a template with the smallest difference is assigned to the face picture. As shown, in a case where the face angle is 21.5°, the most appropriate template selected is a template with a center angle value of 21.8°.

After determining the template for each training picture, the face therein is aligned with its corresponding template. The alignment method can use a similarity transform, or an fine transform, and the like.

After the faces have been aligned, all the aligned images are used as training data to train a deep learning network for face recognition. The output is a trained face recognition depth model. In this step, the inputs are the aligned face images obtained in the previous step. Each image of the training set contains its ID value. A deep network is trained by using ID values of the training images and the aligned images. The network structure can be VGG16, ResNet, SENet, and so on.

The above-described implementation of the embodiment described with horizontal orientation of a person's face as an example can be equally applied to model generation for a specific test scenario, a person's pitch angle, and the like. In these cases, image can be normalized and object recognition model can be generated similarly by applying the template set generated according to the first embodiment, and image normalization and generation of the object recognition model may be performed as described above.

Figure 13:
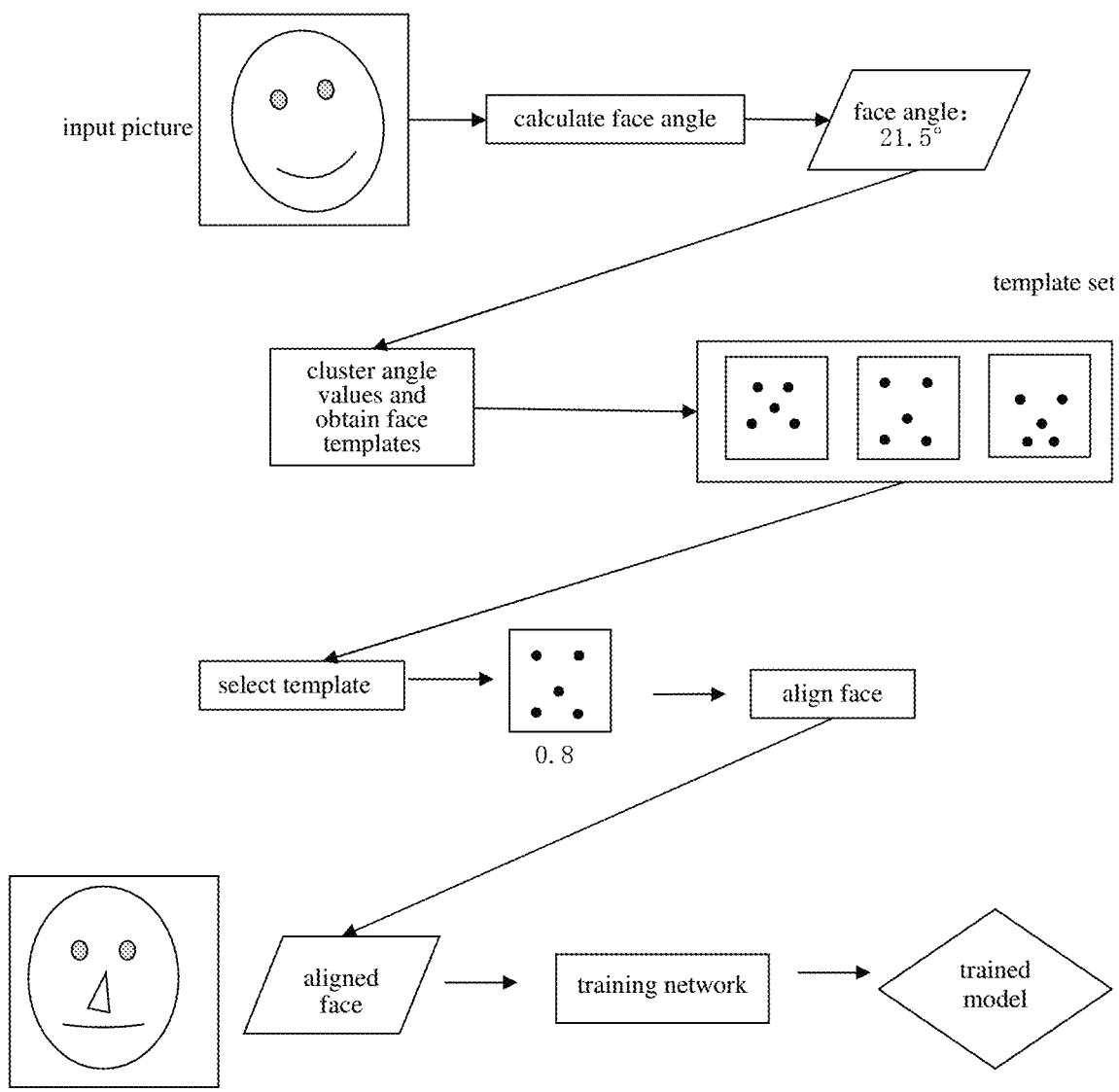
FIG. 13 illustrates a schematic diagram of a model generation operation with respect to face pitch angle according to a second embodiment of the present disclosure.
Figure 14:
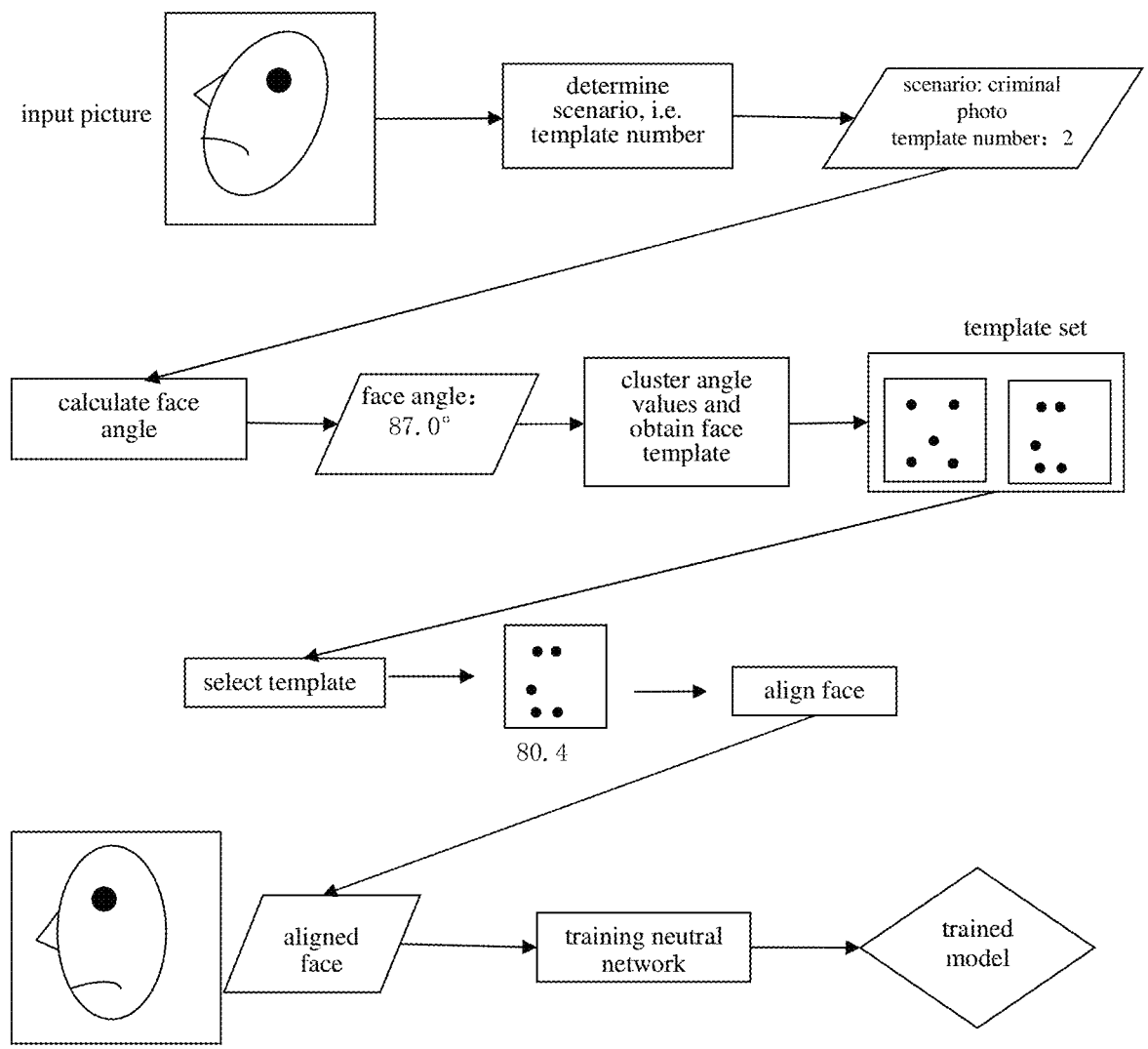
FIG. 14 illustrates a schematic diagram of a model generation operation with respect to face yaw angle in consideration of an application scenario in accordance with a second embodiment of the present disclosure.

FIG. 13 shows model generation according to the present embodiment for a person's pitch angle. FIG. 14 shows model generation according to the present embodiment for a specific test scenario.

It should be noted that the template determination of this embodiment described above can be similarly applied to other attributes of the object image.

Third Embodiment

A third embodiment according to the present disclosure will be described below with reference to the drawings. A third embodiment of the present disclosure relates to a model generation apparatus and method according to the present disclosure.

In the present embodiment, a model is generated from training images by using a transform network.

Figure 15:
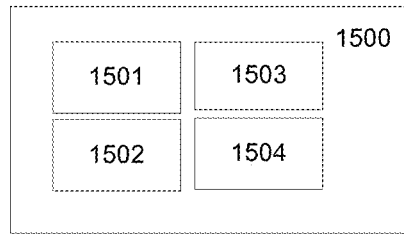
FIG. 15 illustrates a model generation apparatus according to a third embodiment of the present disclosure.

FIG. 15 shows a model generation apparatus according to the present disclosure. The model generation apparatus 1500 includes:

a classification unit 1501 configured to classify specific attributes of a plurality of images through a classification network. For the specific attributes of the images, corresponding classification networks can be used for classification. As an example, a neural network can be used as the classification network.

a division unit 1502 configured to divide the plurality of images into a specific number of sets according to the classification of the specific attributes, and the images in each set have the same attribute classification label.

a normalization unit 1503 configured to transform the image sets by means of a transform network to obtain normalized images. For the specific attributes of the images, corresponding transform networks can be used for normalization. As an example, for, for example, a face angle, an STN (Spatial Transform Network) network may be used as the transform network for face angle alignment.

a model generation unit 1504 configured to generate an object recognition model based on the normalized images.

It should be noted that the above-mentioned respective units are only logical modules divided according to the specific functions they implement, and are not intended to limit specific implementations, for example, may be implemented in software, hardware or a combination of software and hardware. In actual implementation, the various units/modules/subunits described above may be implemented as separate physical entities or may be implemented by a single entity (e.g., a processor (CPU or DSP, etc.), integrated circuit, etc.). Moreover, the various units described above are shown in dashed lines in the figures to indicate that the units may not actually exist, and that the operations/functions they implement may be implemented by the processing circuit itself.

Figure 16:
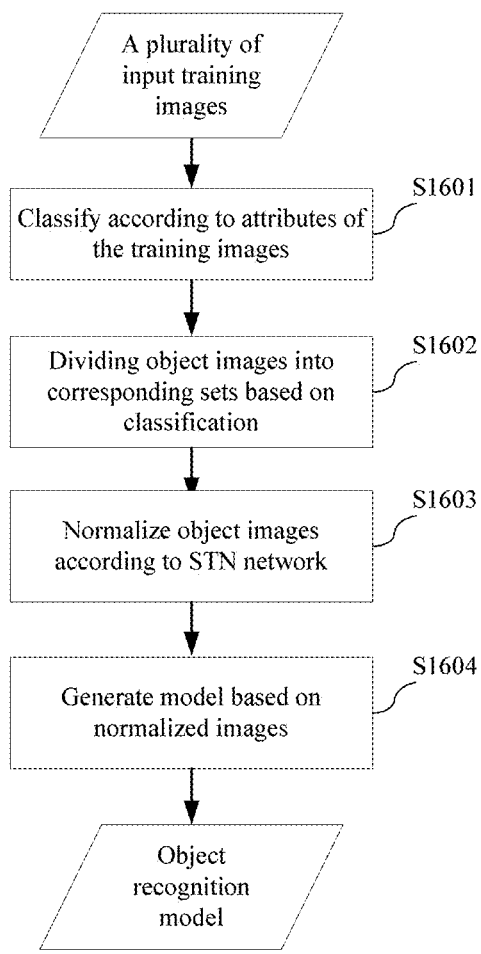
FIG. 16 illustrates a model generation method according to a third embodiment of the present disclosure.

FIG. 16 shows a model generation method according to the present disclosure.

In step S1601 (classification step), specific attributes of a plurality of images are classified by a classification network;

In step S1602 (division step), the plurality of images are divided into a specific number of sets according to the classification of specific attributes, each set having the same attribute classification label;

In step S1603 (normalization step), the image sets are transformed by a transformation network to obtain normalized images;

In step S1604 (model generation step), an object recognition model is generated based on the normalized images.

The method according to this embodiment of the present disclosure may be performed by units in the template generation apparatus of the embodiment of the present disclosure, or may be performed by other processing apparatuses.

Figure 17A:
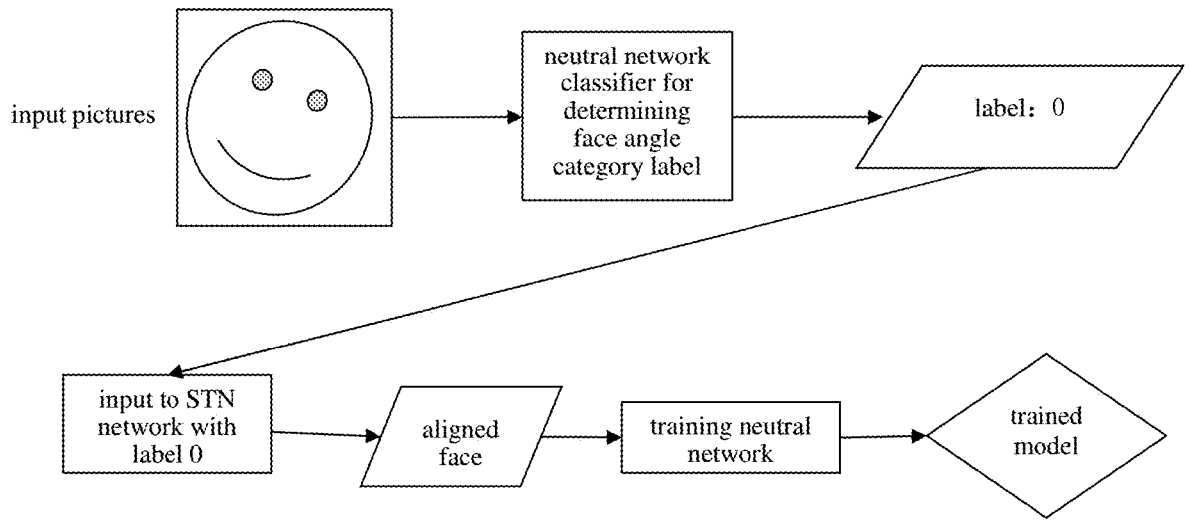
FIGS. 17A and 17B illustrate schematic diagrams of a model generation operation according to a third embodiment of the present disclosure.
Figure 17B:
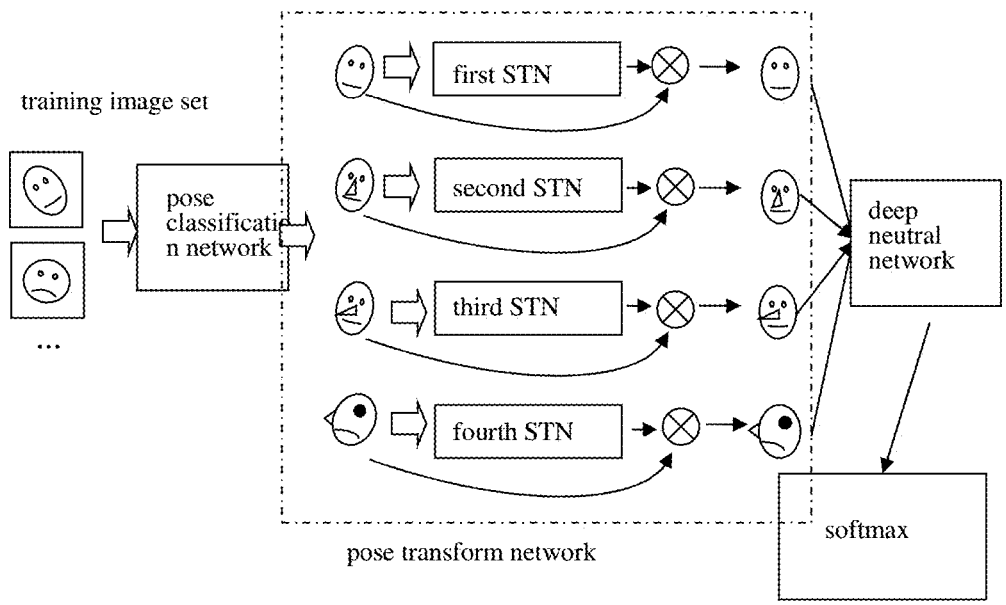

The model generation according to the present embodiment will be briefly described below taking face angle as an example. FIG. 17A and 17B show schematic diagrams of model generation in accordance with the present disclosure.

First, faces in images of a training set are classified by angle. In this step, unlike prior embodiments, it is not necessary to calculate angle values of the faces, but a classification network is used to classify the face angles. There are four categories, and the angles increase in turn.

It should be noted that division into 4 categories here is merely exemplary, and may exist more or fewer categories. As an example, similar to the setting of the number of templates described above, the number of categories can also be predetermined or optimally determined by implementation.

As an example, the input are pictures in a face training set, and the training pictures are input to a pose classification network (e.g., including a neural network and a classifier after the neural network). The labels for the classification are {0, 1, 2, 3}. The output is an angular classification for each picture, such as label 0 shown in FIG. 17A.

After having obtained the face angle categories, we divide the faces into four sets, each of which has the same angular classification label. The inputs are the training set pictures and the angle label for each picture found in the previous step. The pictures belong to the same label are grouped into a set.

After having obtained four face sets, the four face sets are sequentially input into a transform network for training. As an example, the transform network is a STN network that transforms a most suitable face angle for each set. For example, a picture with a label 0 is entered into an STN network with a label 0. Pictures of other labels are also entered into the network with the corresponding labels. The outputs of the STN network are the face images after alignment.

After the faces have been aligned, all the aligned images are used as training data to train a deep neural network for face recognition. The output is a trained face recognition depth model.

In addition, the trained deep neural network can also be input to a loss function, such as softmax, to evaluate the performance of the trained deep neural network. Of course, a loss function such as softmax is generally not included in this embodiment.

It should be noted that the template determination of this embodiment described above can be similarly applied to other attributes of the object image.

Compared to the second embodiment, this embodiment does not require calculation of the face angles, while only the classification labels for the angles are necessary. It is also not necessary to explicitly learn a number of face alignment templates, instead, a deep learning method is utilized to transform the pictures, thereby directly constructing a model for object image feature extraction (for example, a deep neural network). Therefore, compared with the second embodiment, this embodiment has a smaller amount of operations and a higher accuracy of face alignment, and thus the obtained face recognition model is also better.

Fourth Embodiment

A fourth embodiment according to the present disclosure will be described below with reference to the figures. A fourth embodiment of the present disclosure is directed to an object recognition apparatus and method according to the present disclosure.

In the present embodiment, an object in images to be recognized is identified by using the model generated by the previous embodiments.

Figure 18:
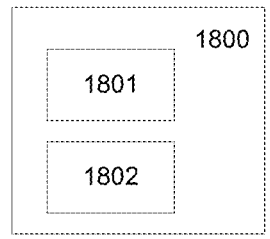
FIG. 18 illustrates an object recognition apparatus according to a fourth embodiment of the present disclosure.

FIG. 18 shows an object recognition apparatus according to the present disclosure. The object recognition apparatus 1800 includes a to-be-recognized image normalization unit 1801 configured to normalize to-be-recognized images to obtain normalized to-be-recognized images, and a recognition unit 1802 configured to apply the object recognition model generated by the above-described embodiments to the normalized to-be-recognized images, to obtain a feature vector of the object for object recognition.

According to one implementation, the to-be-recognized image normalization unit 1801 is configured to select a matching template from a template set generated by applying the method according to the first embodiment to a plurality of training images including the object, so as to normalize the to-be-recognized images.

According to one implementation, the matching template includes such a template in the template set that the difference between the attribute value of the template and the attribute value of the to-be-recognized image is the smallest.

According to an implementation, the to-be-recognized image normalization unit 1801 is further configured to: cluster a plurality of to-be-recognized images according to a distribution of attributes of the plurality of to-be-recognized images; select, from the template set, a matching template for each cluster of the to-be-recognized images; and normalize the to-be-recognized images in each cluster according to the selected matching template.

Thus, by clustering the to-be-recognized images, it is possible to select a more appropriate template for the to-be-recognized images for normalization in consideration of the attributes of the to-be-recognized images, so that the normalized test images can be made more accurate.

According to one implementation, the number of clusters of the to-be-recognized images is equal to the number of templates corresponding to the attribute.

According to one implementation, for one cluster of the to-be-recognized images, the matching template includes a template in the template set whose sequence number is the same as the sequence number of the cluster.

According to one implementation, for a cluster of to-be-recognized images, the matching template includes such a template in the template set that the difference between the attribute values of the template and the attribute values of the cluster center is the smallest. Therefore, the matching template can be determined more accurately.

According to an implementation, in a case where the to-be-recognized images is a plurality of to-be-recognized images of the same object, the obtained feature vector of the object is a statistical value of feature vectors of the plurality of to-be-recognized images.

According to an implementation, in a case where the to-be-recognized images is a plurality of to-be-recognized images of the same object, the obtained feature vector of the object includes a specific number of feature components, the number of the feature components being equal to the number of templates, and each feature component is a statistical value of feature vectors of the to-be-recognized images corresponding to the template.

In particular, instead of characterizing the features of images with a single feature vector, the feature components corresponding to the normalized templates are used to characterize the features of the image, thereby the feature distribution of the same object in the images can be more accurately characterized, so that the similarity between two sets of images belonging to the same object can be more accurately determined.

It should be noted that the above-mentioned respective units are only logical modules divided according to the specific functions they implement, and are not intended to limit specific implementations, for example, may be implemented in software, hardware or a combination of software and hardware. In actual implementation, the various units/modules/subunits described above may be implemented as separate physical entities or may be implemented by a single entity (e.g., a processor (CPU or DSP, etc.), integrated circuit, etc.). Moreover, the various units described above are shown in dashed lines in the figures to indicate that the units may not actually exist, and that the operations/functions they implement may be implemented by the processing circuit itself.

Figure 19:
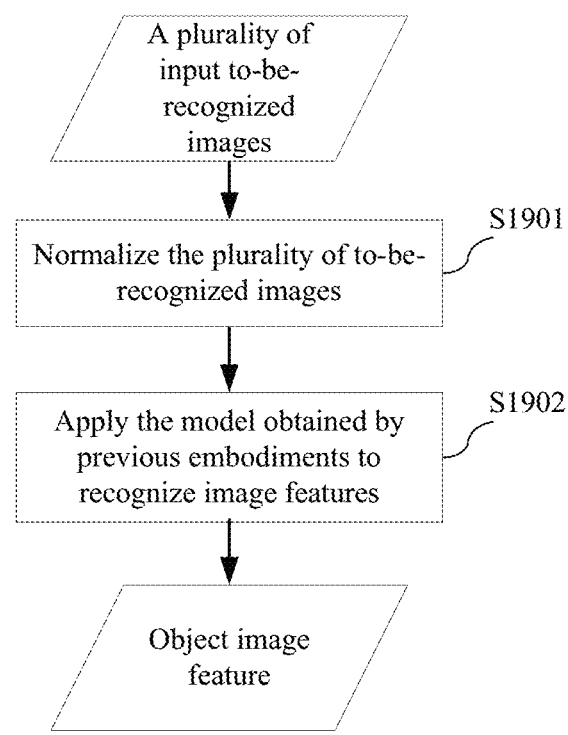
FIG. 19 illustrates an object recognition method according to a fourth embodiment of the present disclosure.

FIG. 19 illustrates an object recognition method according to the present disclosure.

In step S1901 (to-be-recognized image normalization step), the to-be-recognized images are normalized to obtain normalized to-be-recognized images;

In step S1902 (recognition step), the object recognition model generated according to the above-described embodiment is applied to the normalized to-be-recognized images to obtain a feature vector of the object for object recognition.

According to one implementation, the to-be-recognized image normalization step selects a matching template from a template set generated by applying the method according to the first embodiment to a plurality of training images including the object, for normalization of the to-be-recognized images.

According to an implementation, the to-be-recognized image normalization step clusters a plurality of to-be-recognize images according to a distribution of attributes of the plurality of to-be-recognized images; selects a matching template from the template set for each cluster of the to-be-recognized images; and normalizes the to-be-recognized images in each cluster according to the selected matching template.

The method according to this embodiment of the present disclosure may be performed by units in the template generation apparatus of the embodiment of the present disclosure, or may be performed by other processing apparatuses.

Figure 20:
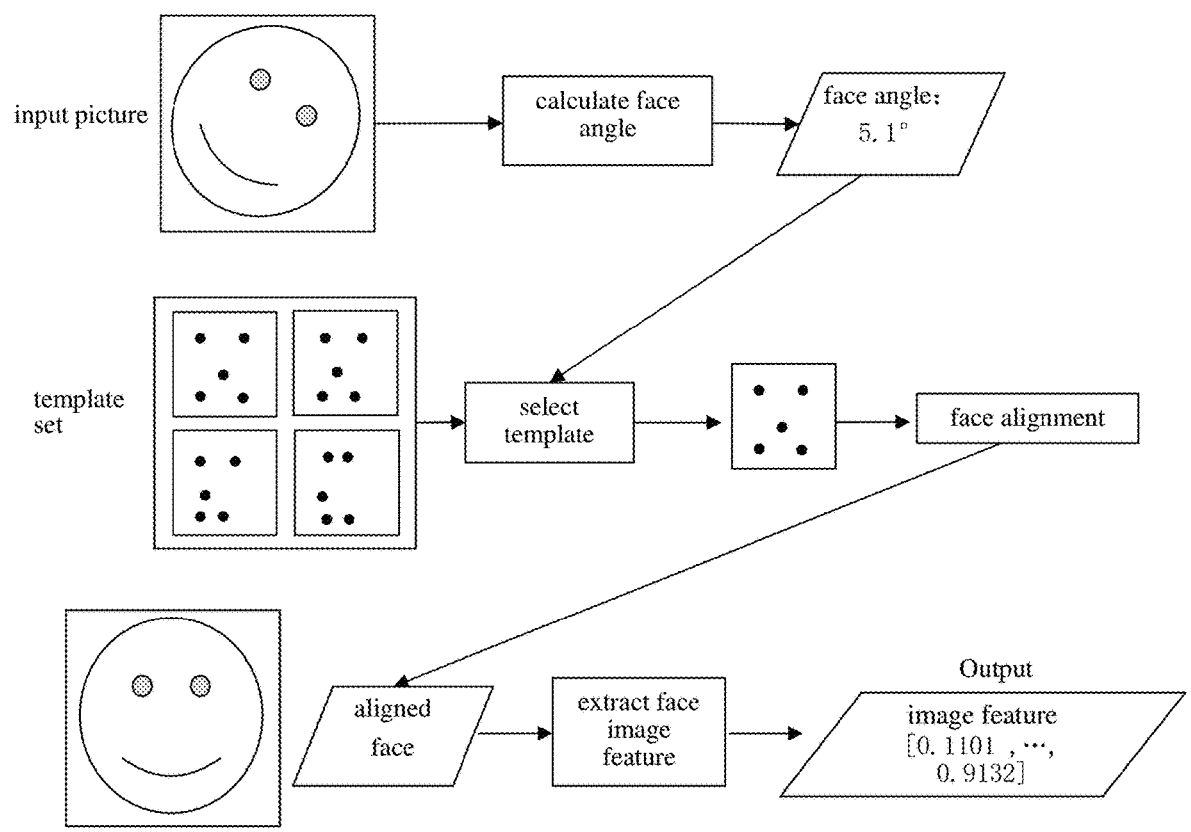
FIG. 20 illustrates a schematic diagram of an object recognition operation with respect to face yaw angle according to a fourth embodiment of the present disclosure.

FIG. 20 is a schematic diagram illustrating an object recognition operation according to the present embodiment. Among them, the face of a person is regarded as an object to be recognized, and the face yaw angle is regarded as an attribute of the object.

This embodiment demonstrates face feature extraction by means of a trained face recognition model and a face pose adaptive alignment method.

First, we calculate face angles of test pictures. We can use various face angle calculation algorithms to obtain the angle values, such as 3DMM-based methods, or deep learning-based methods, and so on.

After the face angles have been obtained, for each test picture, one template is selected from a face template set obtained according to the first embodiment of the present disclosure, such that the difference between angle values of the picture and that of the template selected for it is the smallest.

After the templates for pictures have been determined, face images are aligned with their corresponding templates. The alignment method can use a similarity transform, or an affine transform, and the like.

After the aligned face images have been obtained, a face recognition model obtained according to the second embodiment of the present disclosure, such as a trained neural network, is applied to the aligned face images, thereby outputting feature vectors of the face images for face recognition.

[Clustering the To-Be-Recognized Images]

Figure 21:
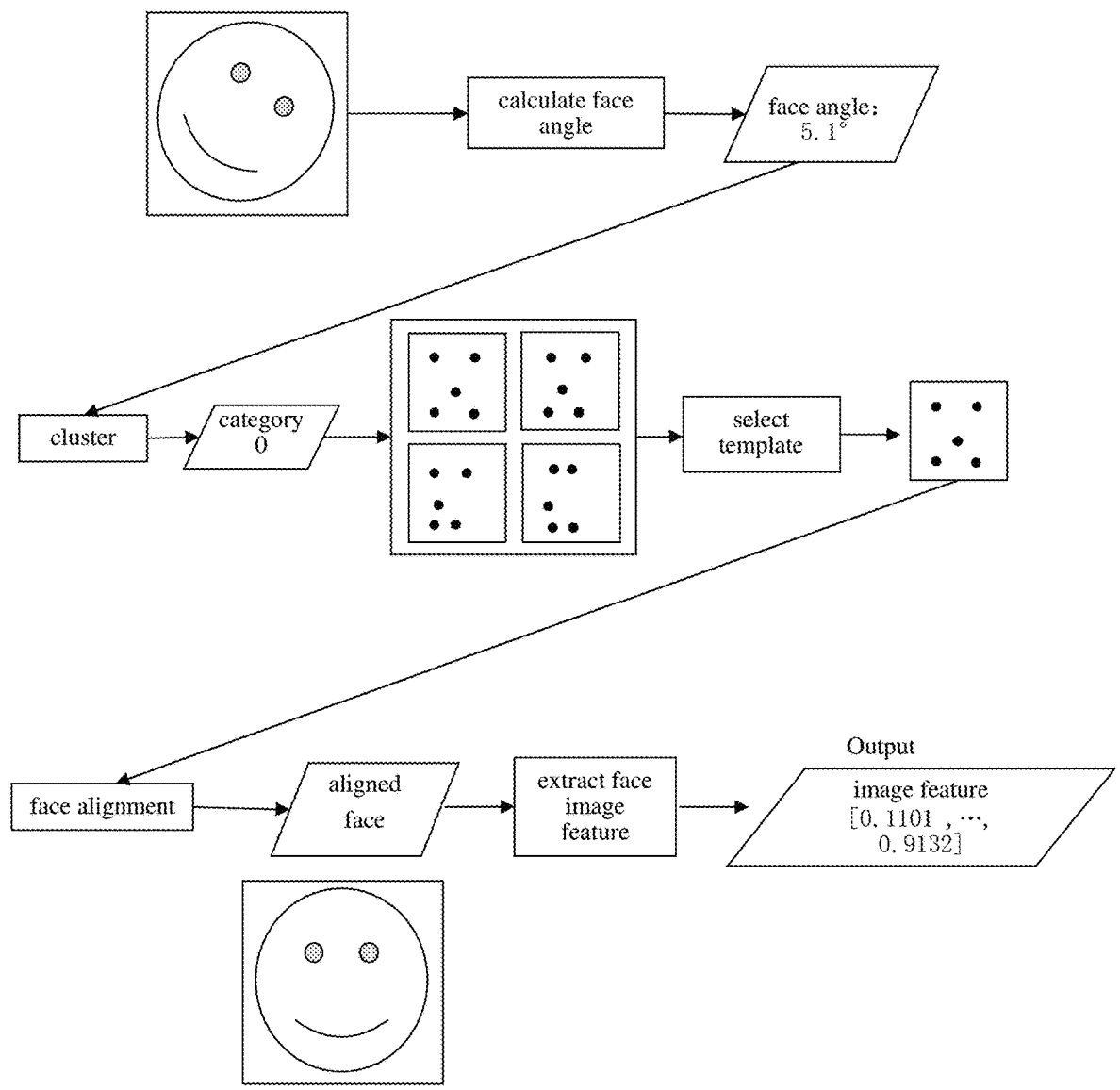
FIG. 21 illustrates a schematic diagram of an object recognition operation with respect to face yaw angle in a case where images to be recognized are clustered according to a fourth embodiment of the present disclosure.

FIG. 21 is a schematic diagram showing an object recognition operation according to the present embodiment in a case where clustering of to-be-recognized images is performed. Among them, the face of a person is regarded as an object to be recognized, and the face yaw angle is regarded as an attribute of the object.

This embodiment demonstrates that a trained face recognition model and a face alignment method conforming to face pose distribution in the test set are applied to perform face feature extraction.

First, the test images (to-be-recognized images) are clustered, and the specific implementation of clustering may be performed by a clustering method known in the art, or may be performed by a clustering operation according to the first embodiment of the present disclosure.

Specifically, the face angles of the test pictures are first calculated, wherein various face angle calculation algorithms can be used to obtain the angle values, such as a 3DMM-based method, or a deep learning-based method, and the like.

After the face angles have been obtained, all the output angles of the training set are clustered. The clustering method can be K-means, general clustering, and the like. The number of clusters is the same as the number of face templates.

Thereafter, for each cluster of to-be-recognized images, a matching template is selected for alignment, such that the same template is used for alignment for all of the to-be-recognized images in each cluster.

As an example, the same face template is assigned to pictures that obtain a uniform face clustering label. The sequence number of this template is the same as the sequence number of the cluster. For example, after the test set has been clustered, the pictures with smaller angles are clustered to 0, and the pictures with the largest angles are clustered to 4. The labels for clusters of to-be-recognized images will also be similarly set. Then, a template with the angle of 6.5 is assigned to pictures of the cluster with the smaller angle; a template with the angle of 80.4 is assigned to pictures of the cluster with the larger angle.

Of course, the matching template may also be selected according to the difference between the center value of each cluster of the image to be tested and the center value of each template, and the matching template is a template with the smallest difference value.

After the templates for the pictures have been determined, a face image is aligned with its corresponding template. The alignment method can use a similarity transform, or an affine transform, and the like.

After the aligned face image has been obtained, it is input into a deep learning network for face recognition. The feature vector of this face image is output.

The face angles are clustered, and a corresponding face template is selected therefor.

This embodiment takes into account pose distribution of the test images compared to the previous embodiment implementation. The previous embodiment implementation assigns each test image a template with the closest angle value, and the angle values of the face templates are determined by a training set, and these angles are not necessarily consistent with the face pose distribution of the test set. In this embodiment, by taking into account the posture distribution of the test set, the angle values of the test set are clustered so as to be more accurate for the subsequent test images, thereby obtaining a better face recognition effect than the previous embodiment.

[Setting a Feature Vector as Feature Components]

This implementation of this embodiment can more accurately determine a feature vector of an image set belonging to the same object, wherein by determining feature components, the determined feature vector can more appropriately reflect the feature distribution of object images, thereby being more suitable for similarity comparison between different sets of images associated with the same object, thereby making it possible to more accurately determine whether different sets of images all indicate the same object.

Figure 22:
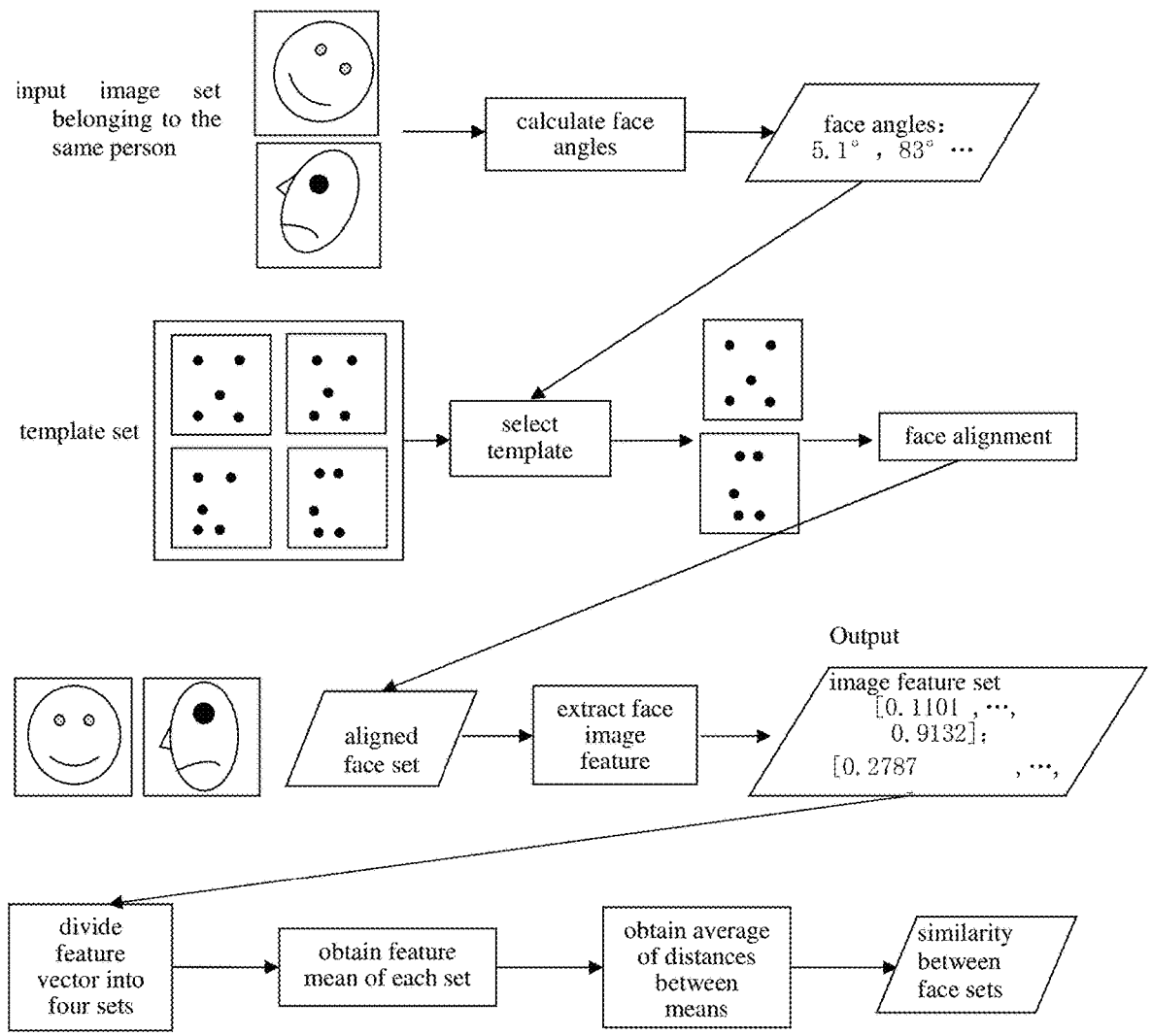
FIG. 22 illustrates a schematic diagram of obtaining an object feature vector including feature components according to a fourth embodiment of the present disclosure.

FIG. 22 shows a schematic diagram of an object recognition operation according to the present embodiment in a case where a feature vector of an image is decomposed into feature components. Among them, the face of a person is regarded as an object to be recognized, and the face yaw angle is regarded as an attribute of the object.

First, we calculate face angles of a test picture set belonging to the same person. We can use various face angle calculation algorithms to obtain angle values, such as 3DMM-based method, or deep learning-based method, and so on.

After all the angles of this person have been obtained, we select a template from our face templates for each test picture, so that the difference between angle values of this picture and angle values of its selected template is the smallest.

After the templates for the pictures have been determined, we align the face images with their corresponding templates. The alignment method can use a similarity transform, or an affine transform, and the like.

After the aligned face images have been obtained, the aligned face images are entered into a deep learning network of face recognition. The feature vector for each face image is output.

After the feature vector of each picture of the same person has been obtained, the feature vectors are divided into four sets according to the different templates to which they correspond to previously. A feature mean is obtained for each set. So a face image set of each person can be represented by four feature vector components. As an example, face images aligned by template 1 (2, 3, 4) are divided into sets 1 (2, 3, 4). Thereafter, a mean of face feature vectors is obtained for each set as a feature vector component of the set. So the output of this step is the four feature vector components of each face picture set.

Finally, when the similarity between two face sets is to be determined, all the similarities between the four vector components of the two sets are obtained, and then a mean value is obtained as the similarity measure of the two sets. After the four feature vector components have been obtained for each face image set in the previous step, the similarity between the two face image sets is obtained, as shown in the following equation.

$$\text{similarity}(a, b) = \frac{1}{16} \sum_{i=1}^{4} \sum_{j=1}^{4} \cos(F_i^a, F_j^b)$$

Wherein, similarity( ) represents a similarity measure function, and a, b respectively represent a first face picture set and a second face picture set. $F\_i \bigcirc a$, $F\_j \bigcirc b$ respectively represent a feature vector component of the first face image set and a feature vector component of the second face image set, and cos ( ) represents a function for calculating the cosine distance between the two feature vector components. Of course, the calculated measurement of the distance between the components can be not only the cosine distance, but also the Euclidean distance and the like.

Thus, by calculating the distance between the four vector components of the first image set and the corresponding four vector components of the second image set, and then calculating a mean value of the distances, a feature mean difference of the two sets can be obtained. When the difference value is less than a predetermined threshold, the objects in the two image sets may be considered to belong to the same object.

It should be noted that the template determination operations of this embodiment as described above can be similarly applied to other attributes of the object image.

Compared to the implementation of the previous embodiments, this embodiment implementation can obtain a feature vector which can more comprehensively characterize the face picture sets of the same person by means of the distribution of the face pose in the test set. In the previous embodiment implementation, the feature of the picture set to which each person belongs is the mean value of all pictures, without considering the pose distribution of the face therein. In this embodiment, the feature vectors of the test set pictures can be divided into corresponding sets according to different posture templates, and the feature of each set represents a feature of the same personal face at a different angle, so the feature mean value will more accurate represent the face. Therefore, the similarity measurement becomes more accurate when the similarity of the two sets is acquired.

Three evaluations TAR@FAR, TPIR@FPIR, and TPIR@rank will be employed as criteria for evaluating the technical effects according to the embodiments of the present disclosure.

Specifically, the IJBA data set was used as experimental data. The IJBA data set contains 10 test data blocks. Using three evaluation indicators TAR@FAR, TPIR@FPIR, TPIR@rank, the evaluation value of each data block is obtained. The mean of the evaluation values of 10 data blocks is finally used as an evaluation criterion for evaluating the algorithms. For comparative experiment, when comparing the scheme according to an embodiment of the present disclosure with a prior method, the same training data VGGFace2 dataset, the same network structure SENet-50, and the same loss function: softmax are utilized.

The experimental results are shown in the table below.

TABLE 1

|  | Prior algorithm | The present algorithm |
|---|---|---|
| TAR@FAR = 0.001 | 0.6298 | 0.6435 |
| TAR@FAR = 0.01 | 0.8364 | 0.8467 |
| TAR@FAR = 0.1 | 0.9627 | 0.9673 |
| TPIR@FPIR = 0.01 | 0.4756 | 0.4907 |
| TPIR@FPIR = 0.01 | 0.7421 | 0.7567 |
| TPIR@rank = 1 | 0.9279 | 0.9306 |
| TPIR@rank = 5 | 0.9735 | 0.9785 |
| TPIR@rank = 10 | 0.9833 | 0.9863 |

As can be seen from the above table, the scheme according to an embodiment of the present disclosure is superior to the prior method in each evaluation index.

The scheme according to an embodiment of the present disclosure adopts an adaptive manner to determine face image templates, which takes into account the pose distribution of all training data, and can select the most suitable template (template with the smallest difference value) for each image, and thus, the sum of all image distortions produced during the alignment operation is the smallest. In particular, the scheme according to an embodiment of the present disclosure adopts a clustering manner to select a face pose template, and the essence of the clustering is to minimize the sum of the distances between each sample and the cluster center. The distance here is the difference in angle between the image before alignment and its specified template. If the value of this function is the smallest, it means that the sum of the angular differences between all the pictures and their corresponding templates is the smallest, so the noise caused by the alignment is also the least. Thus, the scheme according to an embodiment of the present disclosure can greatly reduce the noise in the face alignment process, and thus the accuracy in the face recognition experiment is enhanced, which proves the practicality of our method in face recognition tasks.

In contrast, the prior method fixedly assigns faces of different poses to a fixed template, so that there still are many image distortions caused by face alignment. This causes more noise to be introduced into the face images before the image features are extracted therefrom. Specifically, aligning all face images to the same frontal face template maximizes the alignment noise caused by the alignment. Even if several fixed templates are used for alignment, since the determination of these templates does not take into account the distribution of the training images, it is not optimal for most of the images in the training set. In this case, the alignment noise is higher than embodiments of the present disclosure.

Figure 23:
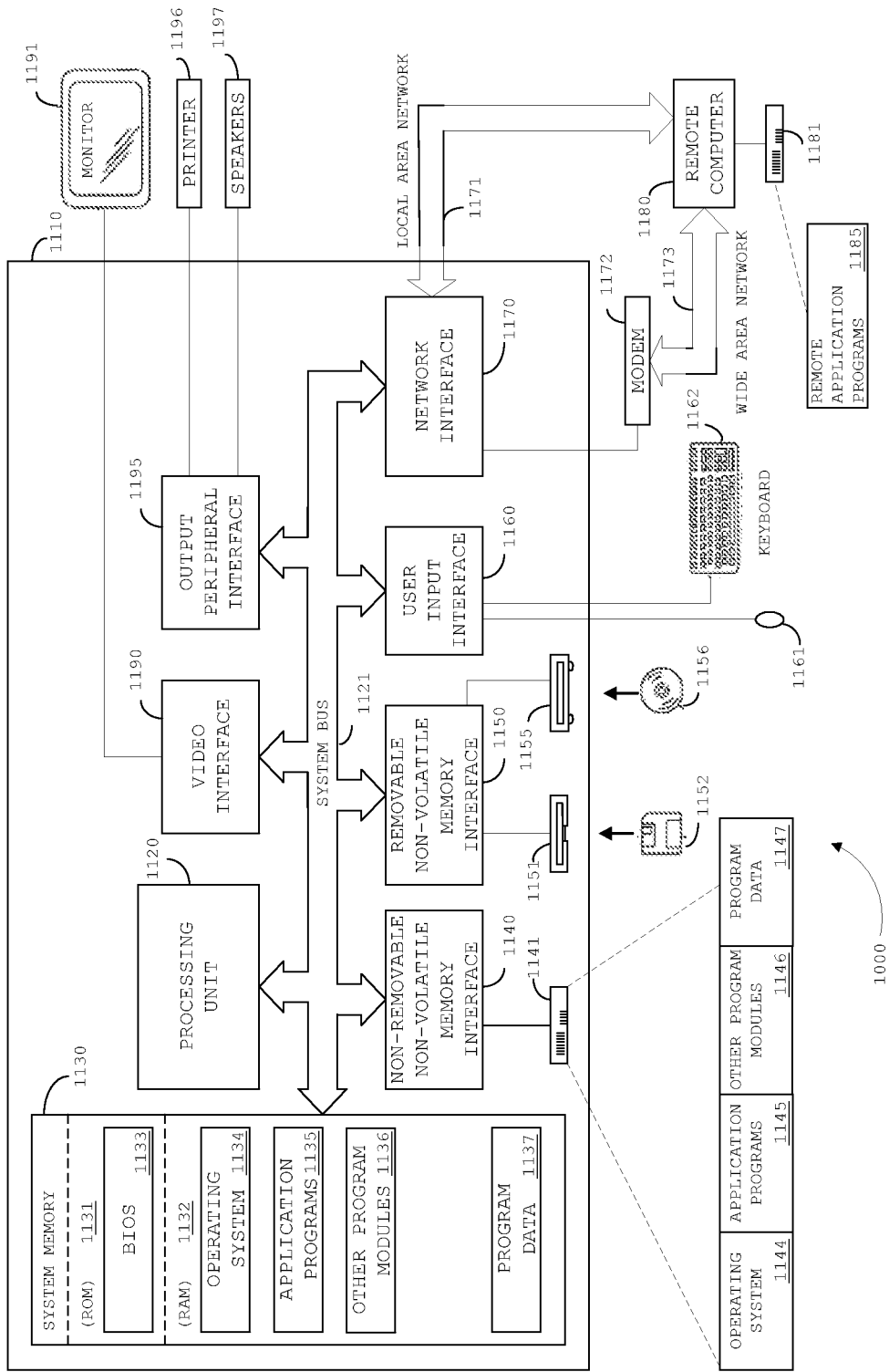
FIG. 23 is a block diagram illustrating an exemplary hardware configuration of a computer system which can implement the embodiments of the present invention.

FIG. 23 is a block diagram illustrating a hardware configuration of a computer system 1000 which can implement the embodiments of the present invention.

As shown in FIG. 23, the computer system comprises a computer 1110. The computer 1110 comprises a processing unit 1120, a system memory 1130, non-removable non-volatile memory interface 1140, removable non-volatile memory interface 1150, user input interface 1160, network interface 1170, video interface 1190 and output peripheral interface 1195, which are connected via a system bus 1121.

The system memory 1130 comprises ROM (read-only memory) 1131 and RAM (random access memory) 1132. A BIOS (basic input output system) 1133 resides in the ROM 1131. An operating system 1134, application programs 1135, other program modules 1136 and some program data 1137 reside in the RAM 1132.

A non-removable non-volatile memory 1141, such as a hard disk, is connected to the non-removable non-volatile memory interface 1140. The non-removable non-volatile memory 1141 can store an operating system 1144, application programs 1145, other program modules 1146 and some program data 1147, for example.

Removable non-volatile memories, such as a floppy drive 1151 and a CD-ROM drive 1155, are connected to the removable non-volatile memory interface 1150. For example, a floppy disk 1152 can be inserted into the floppy drive 1151, and a CD (compact disk) 1156 can be inserted into the CD-ROM drive 1155.

Input devices, such a mouse 1161 and a keyboard 1162, are connected to the user input interface 1160.

The computer 1110 can be connected to a remote computer 1180 by the network interface 1170. For example, the network interface 1170 can be connected to the remote computer 1180 via a local area network 1171. Alternatively, the network interface 1170 can be connected to a modem (modulator-demodulator) 1172, and the modem 1172 is connected to the remote computer 1180 via a wide area network 1173.

The remote computer 1180 may comprise a memory 1181, such as a hard disk, which stores remote application programs 1185.

The video interface 1190 is connected to a monitor 1191.

The output peripheral interface 1195 is connected to a printer 1196 and speakers 1197.

The computer system shown in FIG. 23 is merely illustrative and is in no way intended to limit the invention, its application, or uses.

The computer system shown in FIG. 23 may be implemented to any of the embodiments, either as a stand-alone computer, or as a processing system in an apparatus, possibly with one or more unnecessary components removed or with one or more additional components added.

The invention can be used in many applications. For example, the present invention can be used to monitor, identify, track objects in still images or moving videos captured by a camera, and is particularly advantageous for portable devices equipped with cameras, (camera based) mobile phones, and the like.

Please note the method and apparatus described in the present specification can be implemented as software, firmware, hardware, or any combination thereof. Certain components may, for example, be implemented as software running on a digital signal processor or microprocessor. Other components may, for example, be implemented as hardware and/or application specific integrated circuit.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Those skilled in the art will appreciate that the boundaries between the above operations are merely illustrative. Multiple operations maybe combined into a single operation, a single operation may be distributed among additional operations, and operations may be performed at least partially overlapping in time. Moreover, alternative embodiments may include multiple instances of a particular operation, and the operational sequence may be varied in other various embodiments. However, other modifications, changes, and replacements are equally possible.

While the invention has been described with reference to exemplary embodiments, it is understood that the invention is not limited to the disclosed exemplary embodiments. The scope of the following claims is to be accorded.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for object recognition, comprising:
one or more processors; and
one or more memories storing executable instructions which, when executed by the one or more processors, cause the apparatus to perform operations including:
determining distribution of a specific attribute in a plurality of training images;
determining a template set from the plurality of training images according to the determined distribution of the specific attribute of the plurality of training images, wherein, the determined template set will be used for image normalization;
estimating a specific attribute of an object included in an input image;

determining, based on the estimated specific attribute, a template for normalization for the input image from the determined template set;

performing the image normalization for the input image by using the determined template; and generating a feature for the object included in the input image by using the normalized input image and a trained model generating a feature for a specific object.

2. The apparatus of claim 1, wherein the specific attribute is at least one selected from a group comprising an image attribute and an object attribute.

3. The apparatus of claim 2, wherein the image attribute is at least one selected from a group comprising image resolution, image luminance and image blur; and wherein the object attribute is at least one selected from a group comprising yaw angle, pitch angle, pose, and proportion of an object in the input image.

4. The apparatus of claim 1, wherein the distribution of the specific attribute is a distribution within a predetermined range.

5. The apparatus of claim 4, wherein the specific attribute is a yaw angle of an object in an image, and the predetermined range is [0, 90°] or [−90°, 90°].

6. The apparatus of claim 1, wherein
the template set is determined based on a specific scenario for the input images.

7. The apparatus of claim 1, wherein the template set is generated by using each set of the plurality of training images divided for the specific attribute.

8. The apparatus of claim 1, wherein
executing the executable instructions causes the apparatus to further perform operations including obtaining a predetermined number of clusters from the plurality of training images according to the distribution of the specific attributes in the plurality of training images, and generating one template for each cluster, wherein a predetermined number of generated templates constitute the template set.

9. The apparatus of claim 8, wherein each of the obtained clusters is configured such that, a sum of differences between an attribute value of each image belonging to the cluster and an attribute value of the center of the cluster is minimum.

10. The apparatus of claim 8, wherein for each cluster, an attribute value of a template generated therefrom is equal to the center of the cluster.

11. The apparatus of claim 8, wherein the center of the cluster is equal to the mean value of attribute values of all images belonging to the cluster.

12. The apparatus of claim 8, wherein
executing the executable instructions causes the apparatus to further perform operations including:
calculating an average coordinate for object marks of all object images in a cluster;
calculating an average attribute value of attribute values of all object images in the cluster; and
utilizing the calculated average coordinate and the average attribute value to generate a template for the cluster.

13. The apparatus of claim 8, wherein said predetermined number is determined by:
performing N clustering for the plurality of images respectively, wherein for the Mth clustering,
determining M templates;
normalizing each of a plurality of training images according to a corresponding template in the M templates accordingly, and training a training model for the clustering according to the normalized images, and selecting the number of templates corresponding to the model with the highest recognition accuracy among the obtained N training models as the predetermined number, where N is an integer greater than or equal to 1, and M is an integer greater than or equal to 1 and less than or equal to N.

14. The apparatus of claim 1, wherein the specific attribute comprises at least one attribute, and wherein executing the executable instructions causes the apparatus to further perform operations including:
determining, for each of the at least one attribute, a template subset corresponding to the attribute according to distributions of the attribute in the plurality of training images,
wherein the template set is constructed from the at least one template subset.

15. The apparatus of claim 1, wherein after new images are further received, a new template set is determined based on at least some of the received new images and the plurality of training images previously used for template determination, and wherein the number of templates included in the new template set corresponding to a specific attribute is the same as or different from the number of templates corresponding to the attribute in the template set determined from the plurality of training images.

16. The apparatus of claim 1, wherein the determined template set is determined so that a difference between the attribute of the determined template set and the estimated attribute of the input image is the smallest.

17. The apparatus of claim 1, wherein the normalized image is obtained by geometrically converting the input image based on the attribute of the determined template.

18. The apparatus of claim 1, wherein the object is a human face; and
the specific attribute is an angle of the human face.

19. An apparatus for generating an object recognition model comprising: one or more processors; and one or more memories storing executable instructions which, when executed by the one or more processors, cause the apparatus to perform operations including: determining distribution of a specific attribute in a plurality of training images; determining a template set from the plurality of training images according to the determined distribution of the specific attribute of the plurality of training images; normalizing each of the plurality of training images according to its corresponding template in the template set; performing training based on the normalized plurality of training images to determine an object recognition model; and generating a feature for an object included in an input image by using a normalized input image and the object recognition model generating a feature for a specific object.

20. The apparatus of claim 19, wherein each of the plurality of training images is normalized according to a template corresponding to the specific scenario.

21. The apparatus of claim 19, wherein executing the executable instructions causes the apparatus to further perform operations including:
performing, in a case where the template set includes template subsets corresponding to at least one attribute, the following operations for the at least one attribute in a specific order:
for each attribute, select, from a template subset corresponding to the attribute, a template whose attribute values of the attribute have the smallest difference from that of the training image, as a template corresponding to the training image, so as to perform normalization on the training image with respect to the attribute.

22. The apparatus of claim 21, wherein the specific order is an order in which the image attribute is followed by the specific attribute.

23. The apparatus of claim 19, wherein a template corresponding to each of the plurality of training images is such a template in the template set that a statistical value of differences between at least one attribute values of the template and the image is the smallest, wherein the statistical value is selected from a group comprising mean, weighted mean, and median of the difference.

24. An object recognition model generation apparatus, comprising: one or more processors; and one or more memories storing executable instructions which, when executed by the one or more processors, cause the apparatus to perform operations including: classifying specific attributes of a plurality of training images through a classification network; dividing the plurality of training images into a specific number of sets according to the classification of the specific attributes, and each set has the same attribute classification label; training the training image sets through a transformation network to obtain normalized images; generating an object recognition model based on the normalized images; and generating a feature for an object included in an input image by using a normalized input image and a trained model generating a feature for a specific object.

25. A method for object recognition, comprising:
determining distribution of a specific attribute in a plurality of training images;
determining a template set from the plurality of training images according to the determined distribution of the specific attribute of the plurality of training images, wherein, the determined template set will be used for image normalization;
estimating a specific attribute of an object included in an input image;
determining, based on the estimated specific attribute, a template for normalization for the input image from the determined template set;
performing the image normalization for the input image by using the determined template; and
generating a feature for the object included in the input image by using the normalized input image and a trained model generating a feature for a specific object.

26. The method of claim 25, wherein the template set is determined based on a specific scenario for the input image.

27. The method of claim 25, wherein said template determination step comprises:
a clustering step of obtaining a predetermined number of clusters from the plurality of training images according to the distribution of the specific attributes in the plurality of training images, and
a template generation step of generating one template for each cluster,
wherein the predetermined number of generated templates constitute the template set.

28. The method of claim 27, wherein the template generation step comprises the steps of:
calculating an average coordinate for object marks of all object images in a cluster;
calculating an average attribute value of attribute values of all object images in the cluster; and
utilizing the calculated average coordinate and the average attribute value to generate a template for the cluster.

29. The method of claim 25, wherein the specific attribute comprises at least one attribute, and the template determination step comprises:
a template subset determination step of, for each of the at least one attribute, determining a template subset corresponding to the attribute according to distributions of the attribute in the plurality of training images,
wherein the template set is constructed from the template subset.

30. A device comprising
at least one processor; and
at least one storage device storing instructions thereon that, when executed by the at least one processor, cause the at least one processor to perform the method of claim 25.

31. A non-transitory computer readable storage medium storing instructions which, when executed by a processor, enable performance of the method of claim 25.

* * * * *